United States Patent
Yokomakura et al.

(10) Patent No.: US 11,147,091 B2
(45) Date of Patent: Oct. 12, 2021

(54) BASE STATION APPARATUS, TERMINAL APPARATUS, COMMUNICATION METHOD, AND INTEGRATED CIRCUIT

(71) Applicants: SHARP KABUSHIKI KAISHA, Sakai (JP); FG Innovation Company Limited, New Territories (HK)

(72) Inventors: Kozue Yokomakura, Sakai (JP); Yasuhiro Hamaguchi, Sakai (JP)

(73) Assignees: SHARP KABUSHIKI KAISHA, Sakai (JP); FG Innovation Company Limited, New Territories (HK)

( * ) Notice: Subject to any disclaimer, the term of this patent is extended or adjusted under 35 U.S.C. 154(b) by 0 days.

(21) Appl. No.: 16/607,876

(22) PCT Filed: Apr. 24, 2018

(86) PCT No.: PCT/JP2018/016626
§ 371 (c)(1),
(2) Date: Oct. 24, 2019

(87) PCT Pub. No.: WO2018/199100
PCT Pub. Date: Nov. 1, 2018

(65) Prior Publication Data
US 2020/0196332 A1 Jun. 18, 2020

(30) Foreign Application Priority Data
Apr. 27, 2017 (JP) .............................. JP2017-088200

(51) Int. Cl.
*H04W 4/00* (2018.01)
*H04W 72/12* (2009.01)
*H04W 76/27* (2018.01)
*H04L 5/00* (2006.01)
*H04W 72/04* (2009.01)

(52) U.S. Cl.
CPC ....... *H04W 72/1268* (2013.01); *H04L 5/0048* (2013.01); *H04W 72/0453* (2013.01); *H04W 76/27* (2018.02)

(58) Field of Classification Search
CPC .............. H04L 27/2659; H04L 27/266; H04L 27/3854; H04L 5/0007; H04L 27/2666;
(Continued)

(56) References Cited

U.S. PATENT DOCUMENTS 9,344,953 B2 * 5/2016 Chmiel ................. H04L 5/0051
2017/0111894 A1   4/2017 Chen et al.
2018/0367277 A1 * 12/2018 Zhang .................. H04L 5/0098

OTHER PUBLICATIONS

Huawei et al., "Further details for PT-RS design", R1-1704240, 3GPP TSG RAN WG1 Meeting #88b, Spokane, USA, Apr. 3-7, 2017.
(Continued)

*Primary Examiner* — Huy C Ho
(74) *Attorney, Agent, or Firm* — ScienBiziP, P.C.

(57) ABSTRACT

A terminal apparatus for communicating with a base station apparatus, the terminal apparatus including: a multiplexing unit configured to map a PTRS signal generated based on a pseudo-random code to a resource element; and a transmitter configured to transmit a PUSCH, wherein the multiplexing unit maps the PTRS signal to a subcarrier based on at least an offset of a frequency position, a C-RNTI, the number of resource blocks to be scheduled, and a frequency density of the PTRS, and the transmitter transmits the PUSCH to which the PTRS is mapped.

4 Claims, 14 Drawing Sheets

(58) Field of Classification Search
CPC ..... H04L 1/1861; H04L 1/1893; H04L 7/043;
H04L 7/044; H04L 2007/045; H04L
7/046; H04L 9/0656; H04L 9/0662; H04L
9/0668; H04W 72/1263; H04W 72/1268;
H04W 72/1273; H04W 72/1278; H04W
76/27; H04W 72/0453
USPC .......................................................... 370/329
See application file for complete search history.

(56) References Cited

OTHER PUBLICATIONS

LG Electronics, "DMRS Design Principle", R1-1611812, 3GPP TSG RAN WG1 Meeting #87, Reno, USA Nov. 14-18, 2016.

NTT DOCOMO, "Revision of SI: Study on New Radio Access Technology", RP-161214; 3GPP TSG RAN Meeting #72; Jun. 2016; Busan, Korea.

Ericsson, Panasonic, Huawei, HiSilicon, NTT Docomo, "Merged WF on PTRS structure", R1-1706676; 3GPP TSG RAN WG1 Meeting #88bis; Apr. 2017; Spokane, USA.

LG Electronics, "Discussion on Phase Tracking RS for UL", R1-1702464, 3GPP TSG RAN WG1 Meeting #88, Athens, Greece Feb. 13-17, 2017.

CMCC, "Phase-Tracking Reference Signal Design for High Frequency Systems", R1-1703406, 3GPP TSG RAN WG1 Meeting #88, Athens, Greece Feb. 13-17, 2017.

Fujitsu, "Discussion on Pseudo Random Sequence within a CSIRS resource", R1-121190, 3GPP TSG RAN WG1 Meeting #68bis, Jeju, Korea; Mar. 26-30, 2012.

LG Electronics, "Discussion on UCI piggyback on NR-PUSCH", R1-1704913, 3GPP TSG RAN WG1 Meeting #88bis, Spokane, USA, Apr. 3-7, 2017.

* cited by examiner

BASE STATION APPARATUS, TERMINAL APPARATUS, COMMUNICATION METHOD, AND INTEGRATED CIRCUIT

TECHNICAL FIELD

The present invention relates to a base station apparatus, a terminal apparatus, a communication method, and an integrated circuit.

This application claims priority to JP 2017-088200 filed on Apr. 27, 2017, the contents of which are incorporated herein by reference.

BACKGROUND ART

Technical studies and standardization of Long Term Evolution (LTE)-Advanced Pro and New Radio (NR) technology, as a radio access scheme and a radio network technology for fifth generation cellular systems, are currently conducted by the Third Generation Partnership Project (3GPP) (NPL 1).

The fifth generation cellular system requires three schemes as assumed service scenarios: eMBB (enhanced Mobile BroadBand) which realizes high-speed, high-capacity transmission, URLLC (Ultra-Reliable and Low Latency Communication) which realizes low-latency, high-reliability communication, and mMTC (massive Machine Type Communication) such as IoT (Internet of Things) to which a large number of machine-type devices may be connected.

In NR, a reference signal for tracking phase noise generated by an oscillator is under study in order to perform high-frequency communication. (NPL 2).

CITATION LIST

Non Patent Literature

NPL 1: RP-161214, NTT DOCOMO, "Revision of SI: Study on New Radio Access Technology", June 2016

NPL 2: R1-1706676, Ericsson, Panasonic, Huawei, HiSilicon, NTT Docomo, "Merged WF on PT-RS structure", April, 2017

SUMMARY OF INVENTION

Technical Problem

An object of the present invention is to provide a terminal apparatus, a base station apparatus, a communication method, and an integrated circuit that allow the base station apparatus and the terminal apparatus to efficiently communicate in the above-mentioned radio communication systems.

Solution to Problem (1) To accomplish the object described above, aspects of the present invention are contrived to provide the following measures. In other words, a terminal apparatus according to an aspect of the present invention is a terminal apparatus for communicating with a base station apparatus, the terminal apparatus including: a multiplexing unit configured to map a Phase Tracking Reference Signal (PTRS) signal generated based on a pseudo-random code to a resource element; and a transmitter configured to transmit a Physical Uplink Shared CHannel (PUSCH), wherein the multiplexing unit maps the PTRS signal to a subcarrier based on at least an offset of a frequency position, a Cell-Radio Network Temporary Identifier (C-RNTI), the number of resource blocks to be scheduled, and a frequency density of the PTRS, and the transmitter transmits the PUSCH to which the PTRS is mapped.

(2) Furthermore, in the terminal apparatus according to an aspect of the present invention, variations of the frequency density of the PTRS include the frequency density of the PTRS mapped to every other subcarrier.

(3) Furthermore, the terminal apparatus according to an aspect of the present invention includes a receiver configured to receive a Radio Resource Control (RRC) signal, and information of the offset of the frequency position is notified by a RRC.

(4) Furthermore, the terminal apparatus according to an aspect of the present invention includes a receiver configured to receive an RRC signal and, in a case that a plurality of the PTRS are coded or scrambled, and mapped to the resource element which is identical, an index number for identifying a sequence which has been coded or scrambled is notified by the RRC.

(5) Furthermore, the terminal apparatus according to an aspect of the present invention includes a receiver configured to receive an RRC signal, and information for indicating that the transmission power is configured to zero in some of a plurality of the resource elements of the PTRS is notified by the RRC.

(6) Furthermore, a base station apparatus according to an aspect of the present invention is a base station apparatus for communicating with a terminal apparatus, the base station apparatus including: a receiver configured to receive a PUSCH to which an PTRS signal is mapped; and a demultiplexing unit configured to demultiplex the PTRS signal from the PUSCH, wherein the demultiplexing unit demultiplexes the PTRS signal mapped to a subcarrier, based on at least an offset of a frequency position, a C-RNTI, the number of resource blocks to be scheduled, and a frequency density of the PTRS.

(7) Furthermore, a communication method according to an aspect of the present invention is a communication method for a terminal apparatus for communicating with a base station apparatus, the communication method including the steps of: mapping a PTRS signal generated based on a pseudo-random code to a subcarrier based on at least an offset of a frequency position, a C-RNTI, the number of resource blocks to be scheduled, and a frequency density of the PTRS; and transmitting the PUSCH to which the PTRS signal is mapped.

(8) Furthermore, the communication method according to an aspect of the present invention is a communication method for a base station apparatus for communicating with a terminal apparatus, the communication method including the steps of: receiving a PUSCH to which a PTRS signal is mapped; and demultiplexing, from the PUSCH, the PTRS signal mapped to a subcarrier, based on at least an offset of a frequency position, a C-RNTI, the number of resource blocks to be scheduled, and a frequency density of the PTRS.

(9) Furthermore, an integrated circuit according to an aspect of the present invention is an integrated circuit implemented on a terminal apparatus for communicating with a base station apparatus, the integrated circuit including: a multiplexer configured to map a PTRS signal generated based on a pseudo-random code to a resource element; and a transmitting unit configured to transmit a PUSCH, wherein the multiplexer maps the PTRS signal to a subcarrier based on at least an offset of a frequency position, a C-RNTI, the number of resource blocks to be scheduled, and a frequency density of the PTRS, and the transmitting unit transmits the PUSCH to which the PTRS is mapped.

(10) Furthermore, the integrated circuit of an aspect of the present invention is an integrated circuit implemented on a base station apparatus for communicating with a terminal apparatus, the integrated circuit including: a receiving unit configured to receive a PUSCH to which a PTRS signal is mapped; and a demultiplexer configured to demultiplex the PTRS signal from the PUSCH, wherein the demultiplexer demultiplexes the PTRS signal mapped to a subcarrier, based on at least an offset of a frequency position, a C-RNTI, the number of resource blocks to be scheduled, and a frequency density of the PTRS.

Advantageous Effects of Invention

According to an aspect of the present invention, a base station apparatus and a terminal apparatus can efficiently communicate with each other.

DESCRIPTION OF EMBODIMENTS

Embodiments of the present invention will be described below.

Figure 1:
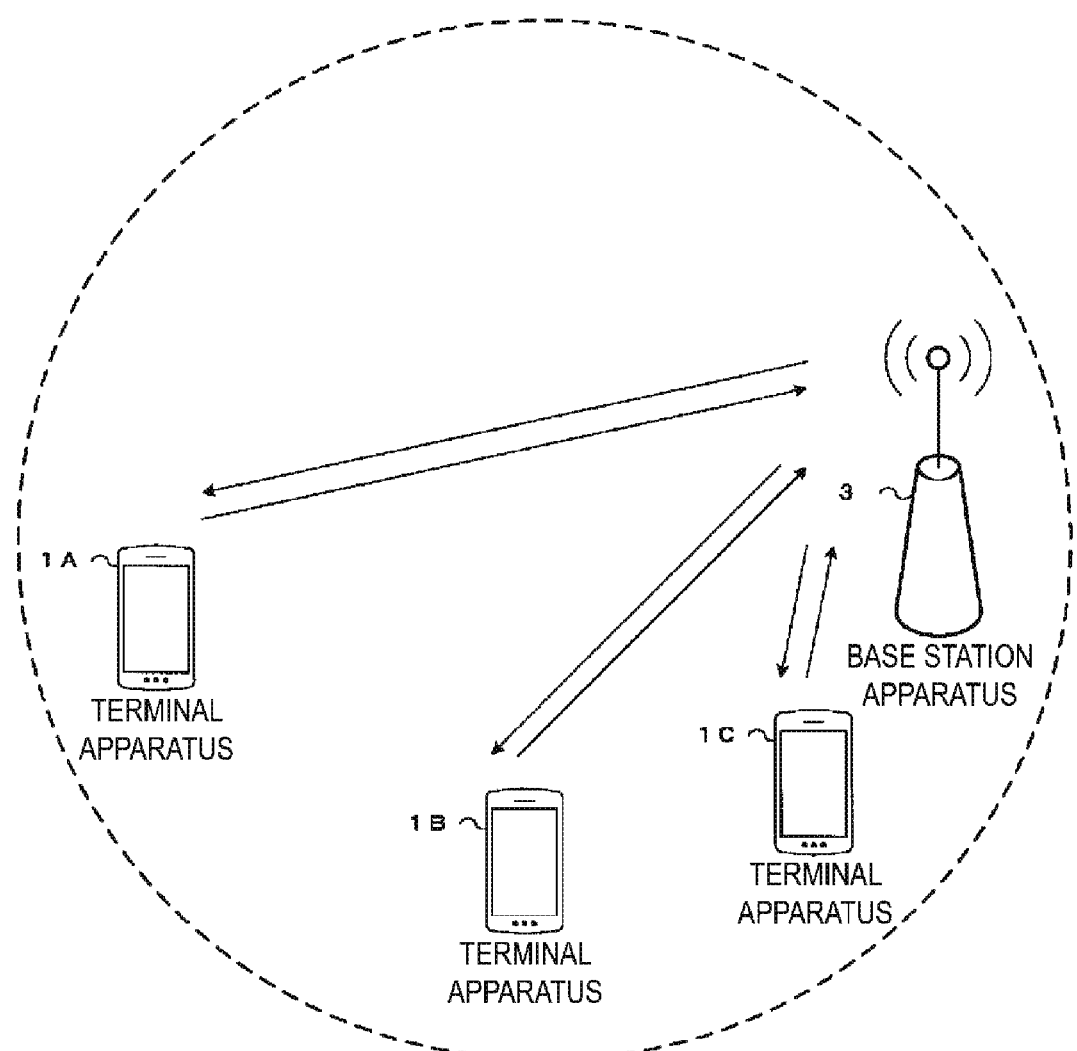
FIG. 1 is a diagram illustrating a concept of a radio communication system according to the present embodiment.

FIG. 1 is a conceptual diagram of a radio communication system according to the present embodiment. In FIG. 1, a radio communication system includes terminal apparatuses 1A to 1C and a base station apparatus 3. Hereinafter, the terminal apparatuses 1A to 1C are each also referred to as a terminal apparatus 1.

The terminal apparatus 1 is also called a user terminal, a mobile station device, a communication terminal, a mobile device, a terminal, User Equipment (UE), and a Mobile Station (MS). The base station apparatus 3 is also referred to as a radio base station apparatus, a base station, a radio base station, a fixed station, a NodeB (NB), an evolved NodeB (eNB), a Base Transceiver Station (BTS), a Base Station (BS), an NR NodeB (NR NB), NNB, a Transmission and Reception Point (TRP), or gNB.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention.

Furthermore, in FIG. 1, in the radio communication between the terminal apparatus 1 and the base station apparatus 3, the CP may not be used, or the above-described transmission scheme with zero padding may be used instead of the CP. Moreover, the CP or zero padding may be added both forward and backward.

In FIG. 1, in a radio communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

In FIG. 1, the following physical channels are used for the radio communication between the terminal apparatus 1 and the base station apparatus 3.

Physical Broadcast CHannel (PBCH)
Physical Control CHannel (PCCH)
Physical Shared CHannel (PSCH)

The PBCH is used to broadcast essential information block ((Master Information Block (MIB), Essential Information Block (EIB), and Broadcast Channel (BCH)) which includes essential information needed by the terminal apparatus 1.

The PCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK may indicate HARQ-ACK for downlink data (Transport block, Medium Access Control Protocol Data Unit (MAC PDU), or Downlink-Shared Channel (DL-SCH)).

Furthermore, the PCCH is used to transmit downlink control information (DCI) in a case of downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK (for example, the number of symbols ranging from the last symbol included in the PSCH to transmission of HARQ-ACK) in response to a scheduled PSCH.

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, in a case of the downlink, the PSCH is used to transmit System Information (SI), a Random Access Response (PAR), and the like. In a case of the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in a higher layer. For example, the base station apparatus 3 and the terminal apparatus 1 may transmit and/or receive Radio Resource Control (RRC) signaling (also referred to as a Radio Resource Control (RRC) message or Radio Resource Control (RRC) information) in a Radio Resource Control (RRC) layer. The base station apparatus 3 and the terminal apparatus 1 may transmit and receive a Medium Access Control (MAC) control element in a MAC layer. Here, the RRC signaling and/or the MAC control element is also referred to as higher layer signaling.

The PSCH may also be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE capabilities in the uplink.

Although the same designations of PCCH and PSCH are commonly used for the downlink and the uplink, different channels may be defined for the downlink and for the uplink. For example, a downlink shared channel may be referred to as a Physical Downlink Shared CHannel (PDSCH). Furthermore, an uplink shared channel may be referred to as a Physical Uplink Shared CHannel (PUSCH). Furthermore, a downlink control channel may be referred to as a Physical Downlink Control Channel (PDCCH). An uplink control channel may be referred to as a Physical Uplink Control CHannel (PUCCH).

In FIG. 1, the following downlink physical signals are used for downlink radio communication. Here, the downlink physical signals are not used to transmit the information output from the higher layers but are used by the physical layer.

Synchronization signal (SS)
Reference Signal (RS)

The synchronization signal may include a Primary Synchronization Signal (PSS) and a Secondary Synchronization Signal (SSS). A cell ID may be detected by using the PSS and SSS.

The synchronization signal is used for the terminal apparatus 1 to establish synchronization in the frequency domain and the time domain in the downlink. Here, the synchronization signal may be used for the terminal apparatus 1 to select precoding or a beam in precoding or beamforming performed by the base station apparatus 3. The beam may also be referred to as transmission or reception filter configuration.

The reference signal is used for the terminal apparatus 1 to perform channel compensation on a physical channel. Here, the reference signal is used for the terminal apparatus 1 to calculate the downlink CSI. Furthermore, the reference signal may be used for a numerology such as a radio parameter or subcarrier spacing, or used for fine synchronization that allows FFT window synchronization to be achieved.

According to the present embodiment, at least one of the following downlink reference signals are used.

Demodulation Reference Signal (DMRS)
Channel State Information Reference Signal (CSI-RS)
Phrase Tracking Reference Signal (PTRS)
Mobility Reference Signal (MRS)

The DMRS is used to demodulate a modulated signal. Note that two types of reference signals may be defined as the DMRS: a reference signal for demodulating the PBCH and a reference signal for demodulating the PSCH or that both reference signals may be referred to as the DMRS. The CSI-RS is used for measurement of Channel State Information (CSI) and beam management. The PTRS is used to track phase according to movement of the terminal or the like. The MRS may be used to measure quality of reception from multiple base station apparatuses for handover. Furthermore, the reference signal may be defined as a reference signal for compensating for phase noise.

The downlink physical channels and/or the downlink physical signals are collectively referred to as a downlink signal. The uplink physical channels and/or the uplink physical signals are collectively referred to as an uplink signal. The downlink physical channels and/or the uplink physical channels are collectively referred to as a physical channel. The downlink physical signals and/or the uplink physical signals are collectively referred to as a physical signal.

The BCH, the UL-SCH, and the DL-SCH are transport channels. A channel used in the Medium Access Control (MAC) layer is referred to as a transport channel. A unit of the transport channel used in the MAC layer is also referred to as a Transport Block (TB) and/or a MAC Protocol Data Unit (PDU). A Hybrid Automatic Repeat reQuest (HARQ) is controlled for each transport block in the MAC layer. The transport block is a unit of data that the MAC layer delivers to the physical layer. In the physical layer, the transport block is mapped to a codeword, and coding processing is performed for each codeword.

The reference signal may also be used for Radio Resource Measurement (RRM). The reference signal may also be used for beam management.

Beam management may be a procedure of the base station apparatus 3 and/or the terminal apparatus 1 for matching directivity of an analog and/or digital beam in a transmission apparatus (the base station apparatus 3 in the downlink and the terminal apparatus 1 in the uplink) with directivity of an analog and/or digital beam in a reception apparatus (the terminal apparatus 1 in the downlink and the base station apparatus 3 in the uplink) to acquire a beam gain.

A procedure for configuring, setting, or establishing a beam pair link may include the following:

Beam selection
Beam refinement
Beam recovery

For example, the beam selection may be a procedure for selecting a beam in communication between the base station apparatus 3 and the terminal apparatus 1. Furthermore, the beam refinement may be a procedure for selecting a beam having a higher gain or changing a beam to an optimum beam between the base station apparatus 3 and the terminal apparatus 1 according to the movement of the terminal apparatus 1. The beam recovery may be a procedure for re-selecting the beam in a case that the quality of a communication link is degraded due to blockage caused by a blocking object, a passing human being, or the like in communication between the base station apparatus 3 and the terminal apparatus 1.

Beam management may include beam selection and beam refinement. The beam recovery may include the following procedures:

detection of beam failure
discovery of new beam
transmission of beam recovery request
monitoring of response to beam recovery request For example, a CSI-RS or a synchronization signal in a synchronization signal block (e.g., SSS), or Quasi Co-Location (QCL) assumption may be used in a case that a transmission beam of the base station apparatus 3 in the terminal apparatus 1 is selected.

In a case that a long term property of a channel on which one symbol on one antenna port is carried may be inferred from a channel on which one symbol on the other antenna port is carried, the two antenna ports are said to be quasi co-located (QCL). The long term property of the channel includes at least one of a delay spread, a Doppler spread, a Doppler shift, an average gain, or an average delay. For example, in a case that an antenna port 1 and an antenna port 2 are quasi co-located (QCL) with respect to the average delay, this means that a reception timing for the antenna port 2 may be inferred from a reception timing for the antenna port 1.

The QCL may also be expanded to beam management. For this purpose, spatially expanded QCL may be newly defined. For example, the long term property of a channel in spatial QCL assumption may be an Angle of Arrival (AoA), a Zenith angle of Arrival (ZoA), or the like and/or an angle spread, for example, Angle Spread of Arrival (ASA) or a Zenith angle Spread of Arrival (ZSA), an Angle of Departure (AoD, ZoD, or the like) or an angle spread thereof, for example, an Angle Spread of Departure (ASD) or a Zenith angle Spread of Departure (ZSS), or Spatial Correlation, in a radio link or channel.

According to this method, operation of the base station apparatus 3 and the terminal apparatus 1 equivalent to beam management may be defined as beam management based on the spatial QCL assumption and radio resources (time and/or frequency).

The subframe will now be described. The subframe in the embodiment may also be referred to as a resource unit, a radio frame, a time period, or a time interval.

Figure 2:
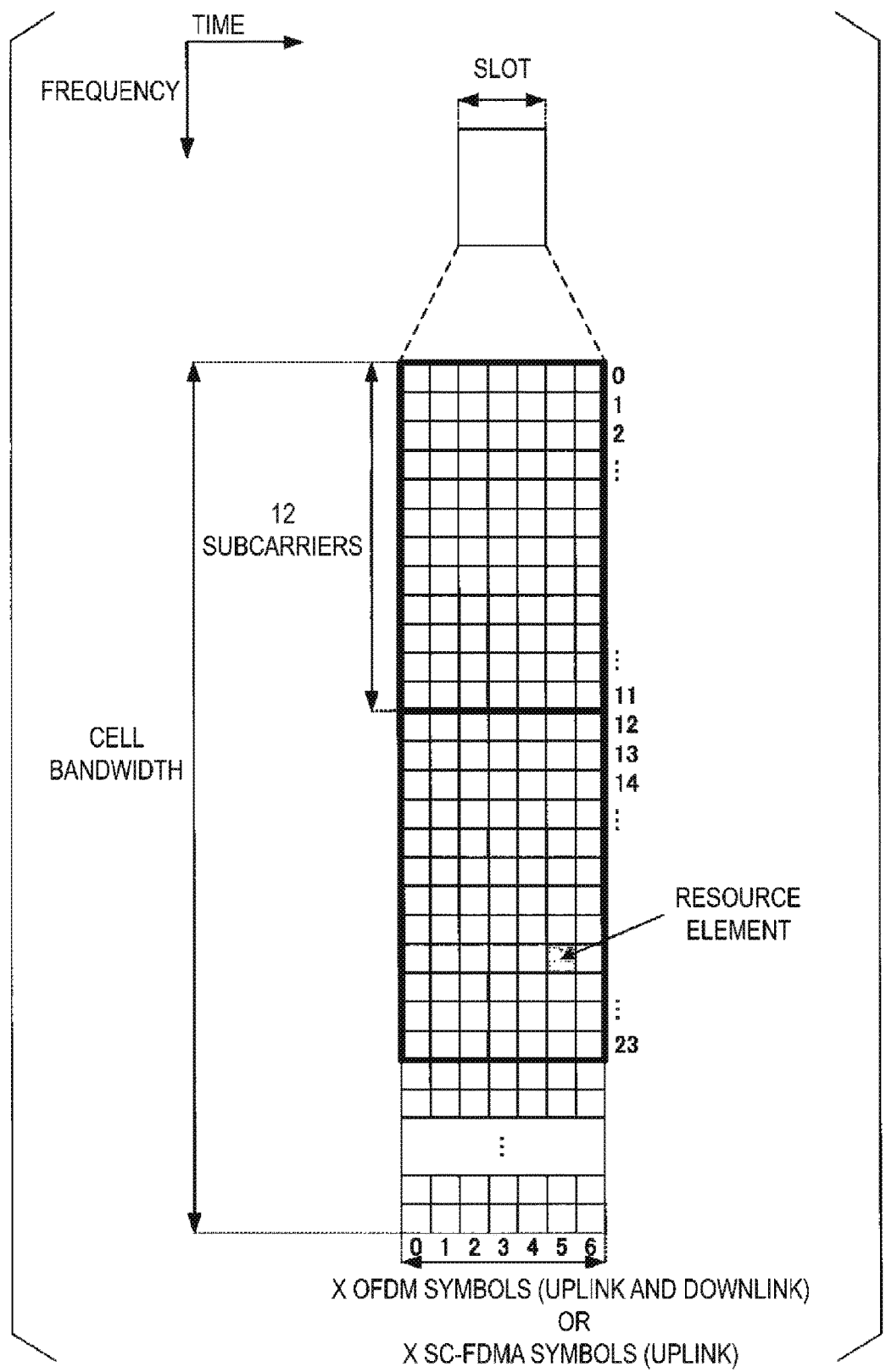
FIG. 2 is a diagram illustrating a schematic configuration of a downlink slot according to the present embodiment.

FIG. 2 is a diagram illustrating a schematic configuration of a downlink slot according to a first embodiment of the present invention. Each of the radio frames is 10 ms in length. Furthermore, each of the radio frames includes 10 subframes and X slots. In other words, the length of one subframe is 1 ms. For each of the slots, time length is defined based on subcarrier spacings. For example, in a case that the subcarrier spacing of an OFDM symbol is 15 kHz and Normal Cyclic Prefixes (NCPs) are used, X=7 or X=14, and X=7 and X=14 correspond to 0.5 ms and 1 ms, respectively. In addition, in a case that the subcarrier spacing is 60 kHz, X=7 or X=14, and X=7 and X=14 correspond to 0.125 ms and 0.25 ms, respectively. FIG. 2 illustrates a case of X=7 as an example. Note that a case of X=14 can be similarly configured by expanding the case of X=7. Furthermore, the uplink slot is defined similarly, and the downlink slot and the uplink slot may be defined separately.

The signal or the physical channel transmitted in each of the slots may be represented by a resource grid. The resource grid is defined by multiple subcarriers and multiple OFDM symbols. The number of subcarriers constituting one slot depends on each of the downlink and uplink bandwidths of a cell. Each element within the resource grid is referred to as a resource element. The resource element may be identified by using a subcarrier number and an OFDM symbol number.

A resource block is used to represent mapping of a certain physical downlink channel (such as the PDSCH) or a certain physical uplink channel (such as the PUSCH) to resource elements. As the resource block, a virtual resource block and a physical resource block are defined. A certain physical uplink channel is first mapped to a virtual resource block. Thereafter, the virtual resource block is mapped to a physical resource block. In a case that the number X of OFDM symbols included in a slot is 7 and NCPs are used, one physical resource block is defined by 7 consecutive OFDM symbols in the time domain and by 12 consecutive subcarriers in the frequency domain. Hence, one physical resource block includes (7×12) resource elements. In a case of Extended CPs (ECPs), one physical resource block is defined by 6 consecutive OFDM symbols in the time domain and by 12 consecutive subcarriers in the frequency domain. Hence, one physical resource block includes (6×12) resource elements. In this case, one physical resource block corresponds to one slot in the time domain and corresponds to 180 kHz in a case of a subcarrier spacing of 15 kHz (720 kHz in a case of 60 kHz) in the frequency domain. Physical resource blocks are numbered from 0 in the frequency domain.

Figure 3:
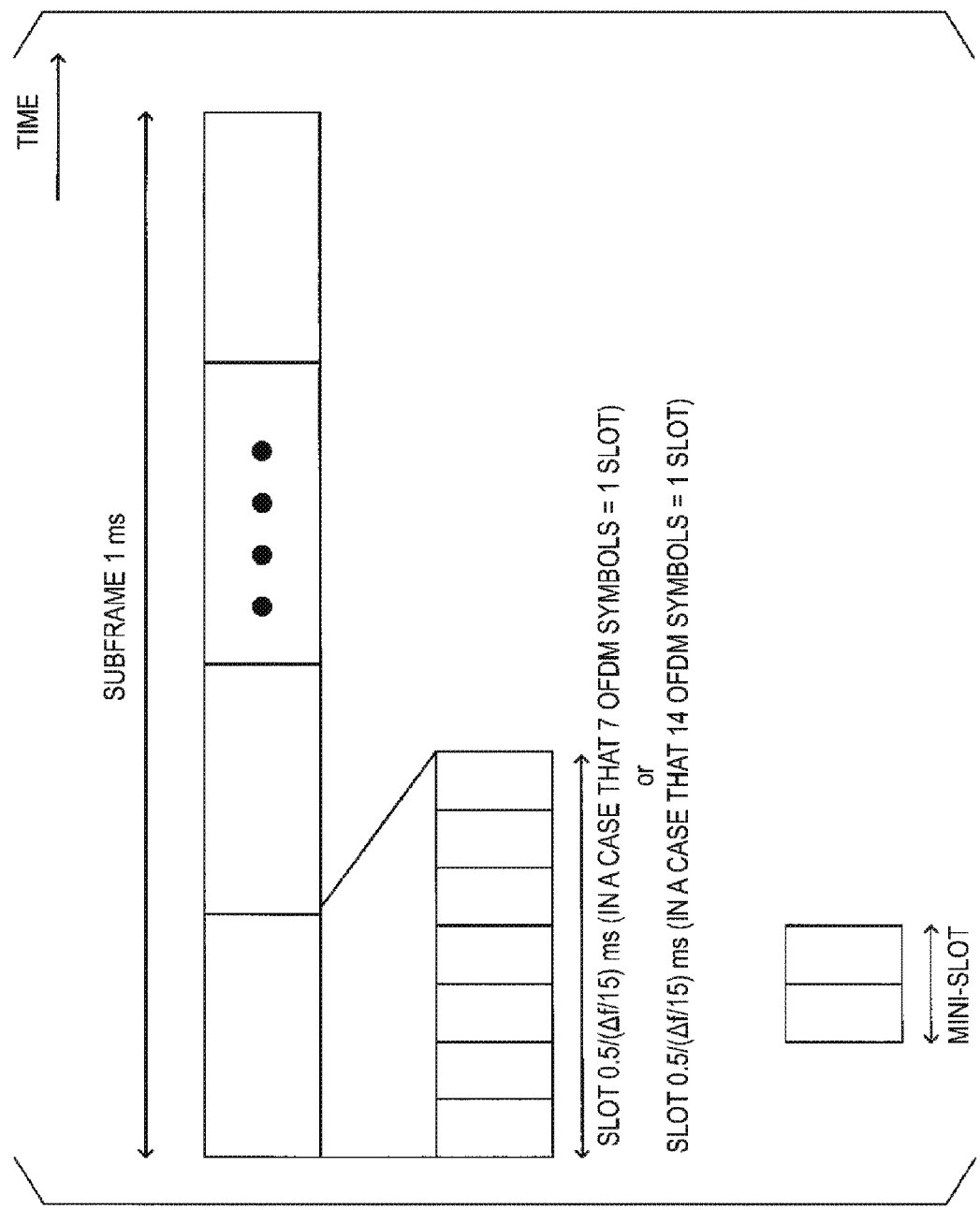
FIG. 3 is a diagram illustrating a relationship between a subframe, a slot, and a mini-slot in a time domain.

The subframe, the slot, and a mini-slot will now be described. FIG. 3 is a diagram illustrating the relationship between the subframe, the slot, and the mini-slot in the time domain. As illustrated in FIG. 3, three types of time units are defined. The subframe is 1 ms regardless of the subcarrier spacing. The number of OFDM symbols included in the slot is 7 or 14, and the slot length depends on the subcarrier spacing. Here, in a case that the subcarrier interval is 15 kHz, 14 OFDM symbols are included in one subframe. Thus, with the assumption that the subcarrier interval is $\Delta f$ (kHz), the slot length may be defined as $0.5/(\Delta f/15)$ ms in a case that the number of OFDM symbols constituting one slot is 7. Here, $\Delta f$ may be defined by subcarrier spacing (kHz). In addition, in a case that the number of OFDM symbols constituting one slot is 7, the slot length may be defined as $1/(\Delta f/15)$ ms. Here, $\Delta f$ may be defined by subcarrier spacing (kHz). Furthermore, the slot length may be defined as $X/14/(\Delta f/15)$ ms, where X is the number of OFDM symbols included in the slot.

Figure 4:
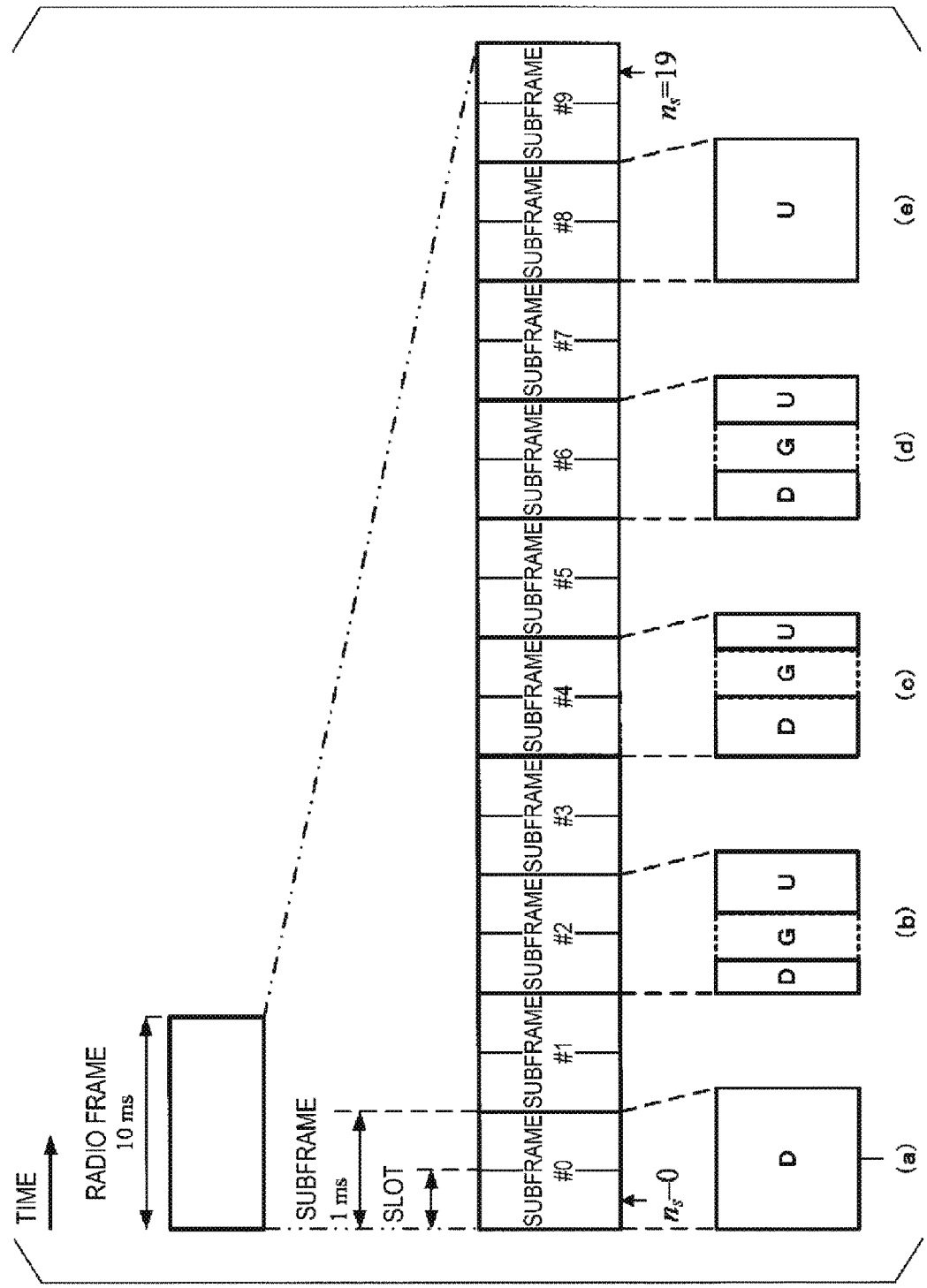
FIG. 4 is a diagram illustrating an example of a slot or a subframe.

The mini-slot (which may be referred to as a sub-slot) is a time unit including OFDM symbols that are less in number than the OFDM symbols included in the slot. FIG. 3 illustrates, by way of example, a case in which the mini-slot includes 2 OFDM symbols. The OFDM symbols in the mini-slot may match the timing for the OFDM symbols constituting the slot. Note that the smallest unit of scheduling may be a slot or a mini-slot. Furthermore, FIG. 4 is a diagram illustrating an example of a slot or a subframe. Here, a case in which the slot length is 0.5 ms at a subcarrier spacing of 15 kHz is illustrated as an example. In FIG. 4, D represents the downlink, and U represents the uplink. As illustrated in FIG. 4, a certain time period (for example, the minimum time period required to be allocated to a single UE in the system) may include one or more of:

the downlink part (duration)
the gap
the uplink part (duration)

FIG. 4(*a*) is an example of using, entirely for downlink transmission, a certain time period (which may be referred to as, for example, a minimum unit of time resource, or a time unit, allocatable to one UE, or alternatively, may be referred to as a time unit having multiple minimum units of time resources bundled together). In FIG. 4(*b*), an uplink scheduling is performed in the first time resource via the PCCH, for example, and an uplink signal is transmitted after a gap for a processing delay of PCCH, a time for switching from a downlink to an uplink, and generation of a transmit signal. In FIG. 4(*c*), a downlink PCCH and/or downlink PSCH are transmitted by using the first time resource, and the PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. In FIG. 4(*d*), a downlink PCCH and/or a downlink PSCH are transmitted by using the first time resource, and a PSCH and/or PCCH are transmitted after a gap for a processing delay, a time for switching from a downlink to an uplink, and generation of a transmit signal. Here, for example, the uplink signal may be used to transmit the uplink data, namely, the UL-SCH. In FIG. 4(*e*), the entire subframe is used for uplink transmission (uplink PSCH or PCCH).

The above-described downlink part and uplink part may include multiple OFDM symbols as is the case with LTE.

Figure 5:
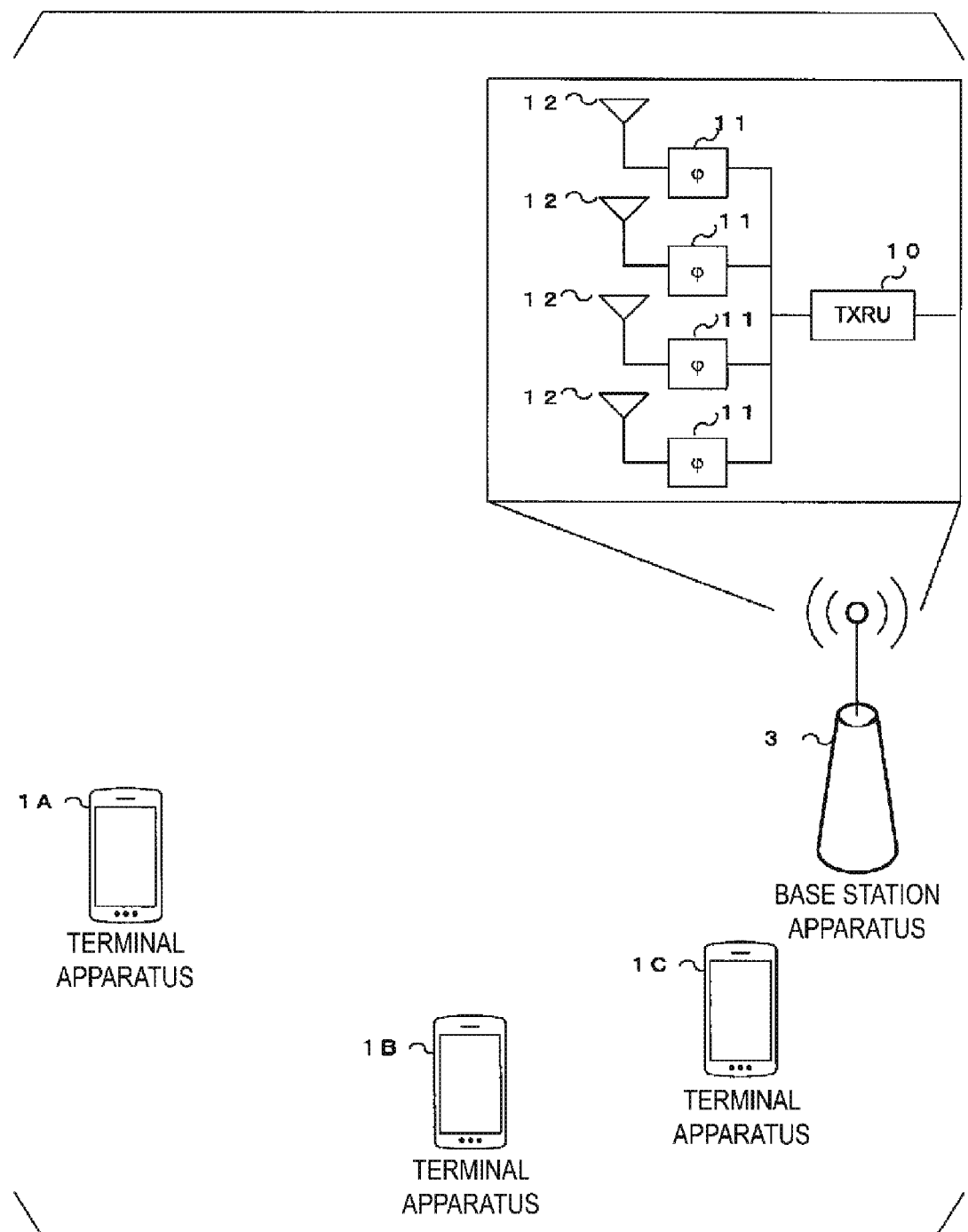
FIG. 5 is a diagram illustrating an example of beamforming.

FIG. 5 is a diagram illustrating an example of beamforming. Multiple antenna elements are connected to one Transceiver unit (TXRU) 10. The phase is controlled by using a phase shifter 11 for each antenna element and a transmission is performed from an antenna element 12, thus allowing a beam for a transmit signal to be directed in any direction. Typically, the TXRU may be defined as an antenna port, and only the antenna port may be defined for the terminal apparatus 1. Controlling the phase shifter 11 allows setting of directivity in any direction. Thus, the base station apparatus 3 can communicate with the terminal apparatus 1 by using a high gain beam.

The present embodiment describes a method for mapping the PTRS to a resource element of each terminal apparatus in a case that the multiple terminal apparatuses 1 are communicating by using a same radio resource. Here, communication by multiple terminal apparatuses 1 by using a same radio resource may include the use of MU-MIMO (Multiuser-MIMO) or the like, which multiplexes the multiple terminal apparatuses 1, for example. All or a part of the radio resources of the multiple terminal apparatuses 1 may overlap with each other.

Figure 8:
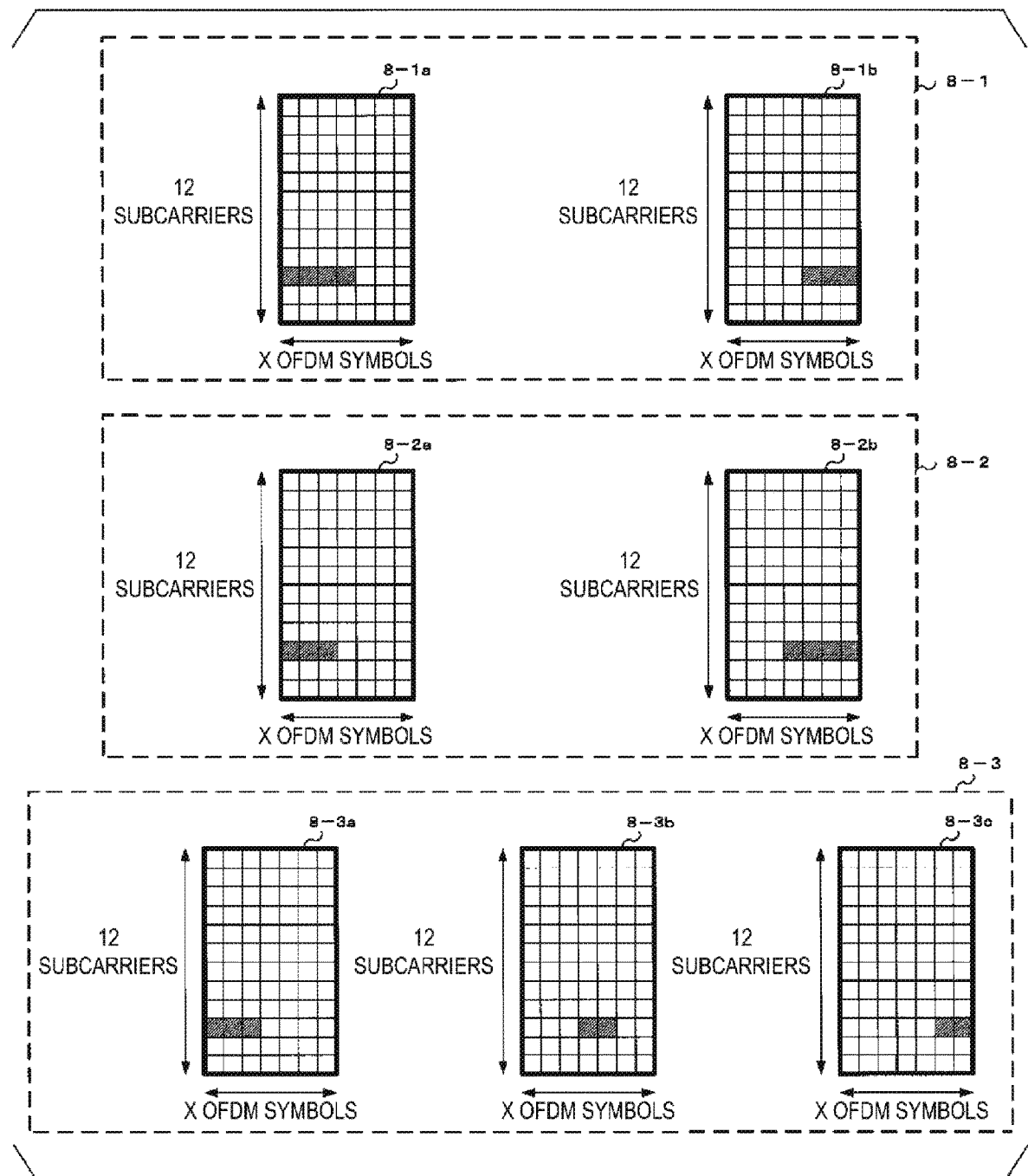
FIG. 8 is a diagram illustrating a first example of PTRS mapping according to a first method in the present embodiment.

FIG. 8 is a diagram illustrating a first example of PTRS mapping according to a first method in the present embodiment. FIG. 8-1 and FIG. 8-2 are examples of the PTRS mapping for each terminal apparatus 1 in a case that two terminal apparatuses 1 are communicating by using a same radio resource. FIG. 8-3 is an example of the PTRS mapping for each terminal apparatus 1 in a case that three terminal apparatuses 1 are communicating by using a same radio resource. Furthermore, the diagrams (FIG. 8-1*a* to FIG. 8-3*c*) included in FIG. 8-1, FIG. 8-2, and FIG. 8-3 each indicate the position at which the PTRS is mapped in a single resource block. The parts filled with diagonal lines correspond to resource elements to which the PTRS are mapped, and the other parts correspond to resource elements to which signals other than the PTRS (data, DMRS, or SRS) are mapped. FIG. 8 is an example in which the PTRS of the multiple terminal apparatuses 1 are mapped at a single frequency position, the frequency position being the third frequency position from the bottom, for example. Here, the first method is a method for configuring the mapping of the PTRS of the multiple terminal apparatuses 1 communicating by using a same resource at different time positions. In other words, the first method is a method for causing the PTRS of the multiple terminal apparatuses 1 to be orthogonal in the time domain.

In a case that, for example, the terminal apparatus 1A and the terminal apparatus 1B are communicating by using a same radio resource, the PTRS of the terminal apparatus 1A may be mapped as illustrated in FIG. 8-1*a*, and the PTRS of the terminal apparatus 1B may be mapped as illustrated in FIG. 8-1*b*. Furthermore, in a case that, for example, the terminal apparatus 1A and the terminal apparatus 1B are communicating by using a same radio resource, the PTRS of the terminal apparatus 1A may be mapped as illustrated in FIG. 8-2*a*, and the PTRS of the terminal apparatus 1B may be mapped as illustrated in FIG. 8-2*b*. As can be seen in FIG. 8-1 and FIG. 8-2, the PTRS of the terminal apparatus 1A and the PTRS of the terminal apparatus 1B are mapped to resource elements at mutually different time positions for a same frequency position. Furthermore, in a case that, for example, the terminal apparatus 1A, the terminal apparatus 1B, and the terminal apparatus 1C are communicating by using a same radio resource, the PTRS of the terminal apparatus 1A may be mapped as illustrated in FIG. 8-3*a*, the PTRS of the terminal apparatus 1B may be mapped as illustrated in FIG. 8-3*b*, and the PTRS of the terminal apparatus 1C may be mapped as illustrated in FIG. 8-3*c*. As can be seen in FIG. 8-3, the PTRS of the terminal apparatus 1A, the terminal apparatus 1B, and the terminal apparatus 1C are mapped to resource elements at mutually different time positions for a same frequency position.

In FIG. 8, the number of terminal apparatuses 1 communicating by using a same radio resource may be four or more, and the time positions of the PTRS mapped for each of the terminal apparatuses 1 are not limited to those of FIG. 8. Furthermore, although the frequency position at which the PTRS is mapped is assumed to be the third subcarrier from the bottom in FIG. 8 as an example, any one of the subcarriers in the resource block may be used.

Each diagram in the following drawings (FIG. 9, FIG. 10, FIG. 11, FIG. 12, FIG. 13, and FIG. 14) illustrates, similarly to FIG. 8, the positions at which the PTRS are mapped within a single resource block. The parts filled with diagonal lines correspond to resource elements to which the PTRS are mapped, and the other parts correspond to resource elements to which signals other than the PTRS (data, DMRS, or SRS) are mapped.

The PTRS, in the case of downlink, may be mapped only to a resource element other than resource elements to which a PSS, SSS, PBCH, DMRS, or CSI-RS is mapped. Furthermore, a pattern may be defined such that the PTRS, in the case of downlink, is mapped only to a resource element other than resource elements to which a PSS, SSS, PBCH, DMRS, or CSI-RS is mapped.

The PTRS, in the case of uplink, may be mapped only to a resource element other than resource elements to which a DMRS or SRS is mapped. Furthermore a pattern may be defined such that the PTRS, in the case of uplink, is mapped only to a resource element other than resource elements to which a DMRS or SRS is mapped.

Figure 9:
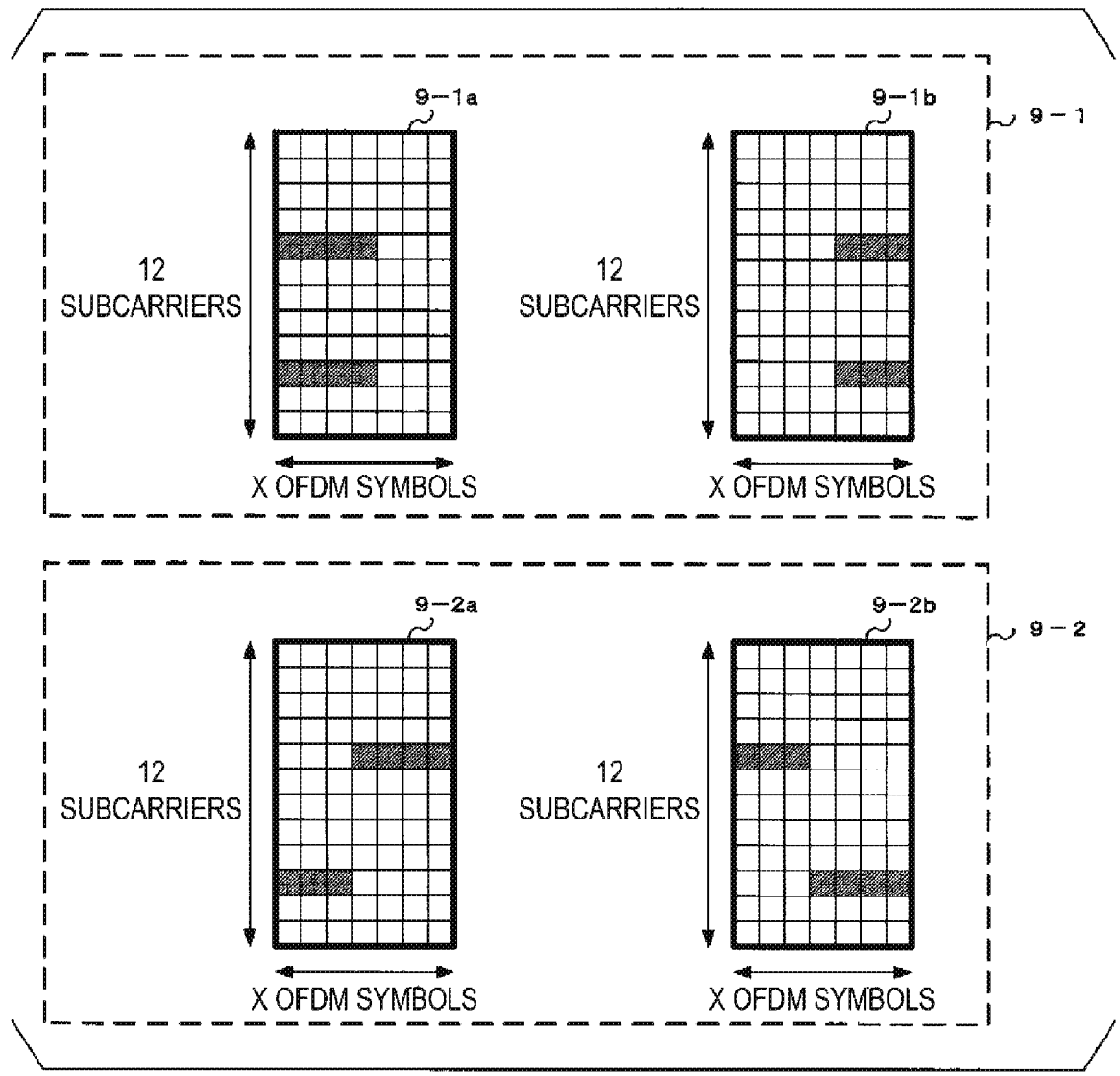
FIG. 9 is a diagram illustrating a second example of PTRS mapping according to the first method in the present embodiment.

FIG. 9 is a diagram illustrating a second example of PTRS mapping according to the first method in the present embodiment. FIG. 9 is an example in which the PTRS of the multiple terminal apparatuses 1 are mapped at two frequency positions. FIG. 9-1 and FIG. 9-2 are examples of the PTRS mapping for each terminal apparatus 1 in a case that two terminal apparatuses 1 are communicating by using a same radio resource.

In a case that, for example, the terminal apparatus 1A and the terminal apparatus 1B are communicating by using a same radio resource, the PTRS of the terminal apparatus 1A may be mapped as illustrated in part FIG. 9-1*a*, and the PTRS of the terminal apparatus 1B may be mapped as illustrated in FIG. 9-1*b*. Furthermore, in a case that, for example, the terminal apparatus 1A and the terminal apparatus 1B are communicating by using a same radio resource, the PTRS of the terminal apparatus 1A may be mapped as illustrated in part FIG. 9-2*a*, and the PTRS of the terminal apparatus 1B may be mapped as illustrated in FIG. 9-2*b*. As can be seen in FIG. 9-1 and FIG. 9-2, the PTRS of the terminal apparatus 1A and the PTRS of the terminal apparatus 1B are mapped to resource elements at mutually different time positions for a same frequency position.

In FIG. 9, the number of terminal apparatuses 1 communicating by using a same radio resource may be two or more, and the time position of the PTRS mapped for each terminal apparatus 1 is not limited to that in FIG. 9. Furthermore, the frequency position at which the PTRS are mapped is not limited to that of FIG. 9, and any two subcarriers within the resource block may be used. Although FIG. 9 illustrate an example of a method for causing the PTRS of the multiple terminal apparatuses on two subcarriers to be orthogonal in the time domain, the number of subcarriers may be three or more.

Figure 10:
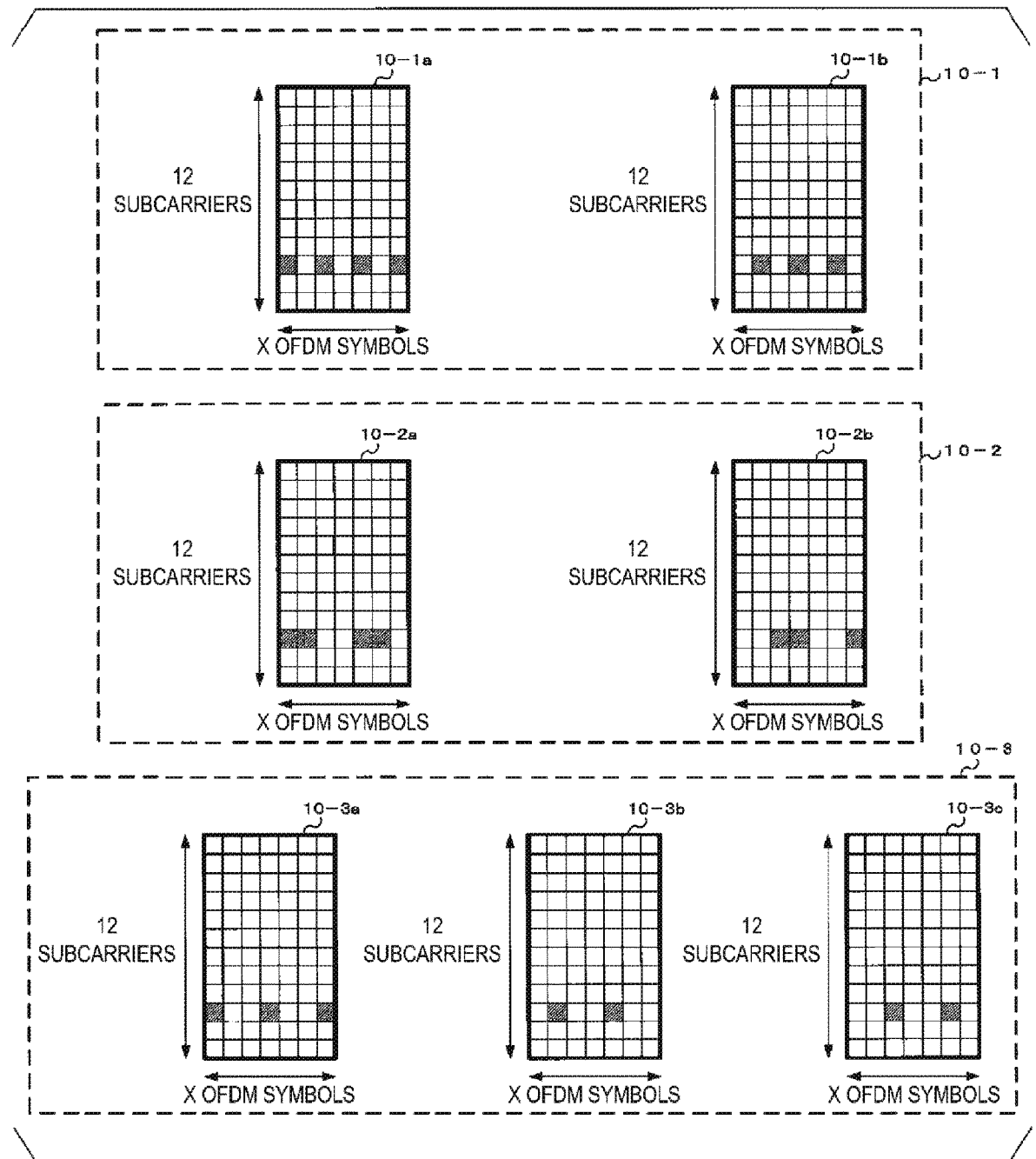
FIG. 10 is a diagram illustrating a third example of PTRS mapping according to the first method in the present embodiment.

FIG. 10 is a diagram illustrating a third example of PTRS mapping according to the first method in the present embodiment. FIG. 10 is an example in which the PTRS of multiple terminal apparatuses 1 are mapped at a single frequency position at a constant time interval. FIG. 10-1 and FIG. 10-2 are examples of the PTRS mapping for each terminal apparatus 1 in a case that two terminal apparatuses 1 are communicating by using a same radio resource. FIG. 10-3 is an example of the PTRS mapping for each terminal apparatus 1 in a case that three terminal apparatuses 1 are communicating by using a same radio resource.

In a case that, for example, the terminal apparatus 1A and the terminal apparatus 1B are communicating by using a same radio resource, the PTRS of the terminal apparatus 1A may be mapped as illustrated in FIG. 10-1*a*, and the PTRS of the terminal apparatus 1B may be mapped as illustrated in FIG. 10-1*b*. Furthermore, in a case that, for example, the terminal apparatus 1A and the terminal apparatus 1B are communicating by using a same radio resource, the PTRS of the terminal apparatus 1A may be mapped as illustrated in FIG. 10-2*a*, and the PTRS of the terminal apparatus 1B may be mapped as illustrated in FIG. 10-2*b*. As can be seen in FIG. 10-1 and FIG. 10-2, the PTRS of the terminal apparatus 1A and the PTRS of the terminal apparatus 1B are mapped to resource elements at mutually different time positions for a same frequency position. Furthermore, in a case, for example, the terminal apparatus 1A, the terminal apparatus 1B, and the terminal apparatus 1C are communicating by using a same radio resource, the PTRS of the terminal apparatus 1A may be mapped as illustrated in FIG. 10-3*a*, the PTRS of the terminal apparatus 1B may be mapped as illustrated in FIG. 10-3*b*, and the PTRS of the terminal apparatus 1C may be mapped as illustrated in FIG. 10-3*c*. As can be seen in FIG. 10-3, the PTRS of the terminal apparatus 1A, the terminal apparatus 1B, and the terminal apparatus 1C are mapped to resource elements at mutually different time positions for a same frequency position.

In FIG. 10, the number of terminal apparatuses 1 communicating by using a same radio resource may be four or more, and the time position of the PTRS mapped to each terminal apparatus 1 is not limited to that of FIG. 10. The interval at which the PTRS are mapped is not limited to that of FIG. 10. Although the PTRS are mapped at an interval of two resource elements in FIG. 10-2, for example, the PTRS may be mapped at an interval of three or more resource elements. Furthermore, for example, the PTRS need not be mapped at a constant and identical interval, and may be mapped with multiple intervals being combined. Furthermore, although the frequency position at which the PTRS are mapped is the third subcarrier from the bottom in FIG. 10, for example, any subcarrier within the resource block may be used.

Figure 11:
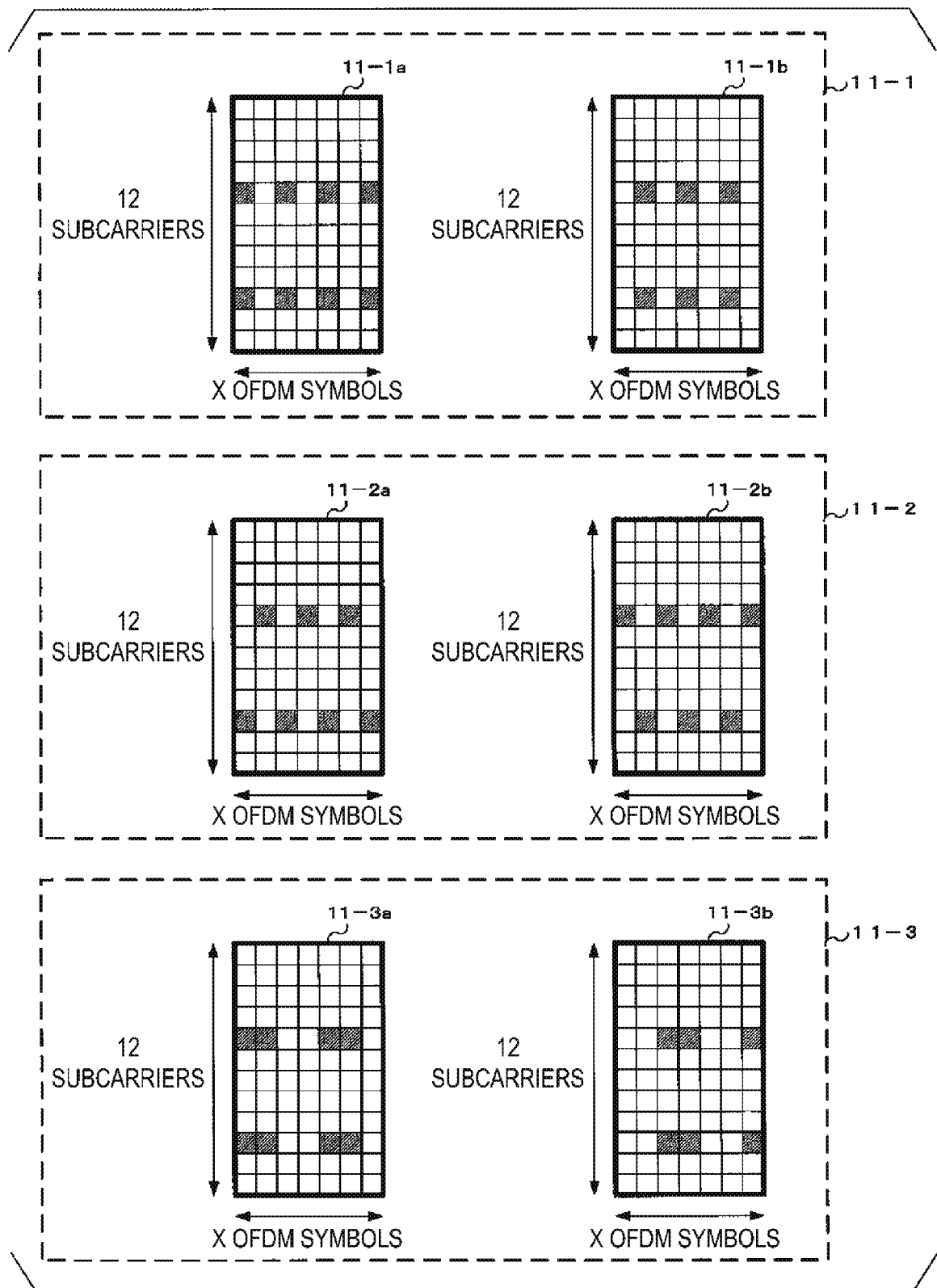
FIG. 11 is a diagram illustrating a fourth example of PTRS mapping according to the first method in the present embodiment.

FIG. 11 is a diagram illustrating a fourth example of PTRS mapping according to the first method in the present embodiment. FIG. 11 is an example in which the PTRS of the multiple terminal apparatuses 1 are mapped at a constant time interval for two frequency positions. FIG. 11-1, FIG. 11-2, and FIG. 11-3 are examples of the PTRS mapping of each terminal apparatus 1 in a case that two terminal apparatuses 1 are communicating by using a same radio resource.

In a case that, for example, the terminal apparatus 1A and the terminal apparatus 1B are communicating by using a same radio resource, the PTRS of the terminal apparatus 1A may be mapped as illustrated in FIG. 11-1a, and the PTRS of the terminal apparatus 1B may be mapped as illustrated in FIG. 11-1b. Furthermore, in a case that, for example, the terminal apparatus 1A and the terminal apparatus 1B are communicating by using a same radio resource, the PTRS of the terminal apparatus 1A may be mapped as illustrated in part FIG. 11-2a, and the PTRS of the terminal apparatus 1B may be mapped as illustrated in FIG. 11-2b. Furthermore, in a case that, for example, the terminal apparatus 1A and the terminal apparatus 1B are communicating by using a same radio resource, the PTRS of the terminal apparatus 1A may be mapped as illustrated in FIG. 11-3a, and the PTRS of the terminal apparatus 1B may be mapped as illustrated in FIG. 11-3b. As can be seen in FIG. 11-1, FIG. 11-2, and FIG. 11-3, the PTRS of the terminal apparatus 1A and the PTRS of the terminal apparatus 1B are mapped to resource elements at mutually different time positions for a same frequency position.

In FIG. 11, the number of terminal apparatuses 1 communicating by using a same radio resource may be two or more, and the time position of the PTRS mapped for each terminal apparatus 1 is not limited to that of FIG. 11. The interval in the time direction at which the PTRS are mapped is not limited to that of FIG. 11. Although the PTRS are placed at an interval of two time symbols in FIG. 11-3, for example, the PTRS may be mapped at an interval of three or more time symbols. Furthermore, for example, the PTRS need not be mapped at a constant and identical interval, and may be mapped with multiple intervals being combined. Moreover, the frequency position at which the PTRS are mapped is not limited to that of FIG. 11, and any two subcarriers within the resource block may be used. Although FIG. 11 is an example of a method for causing PTRS of multiple terminal apparatuses on two subcarriers to be orthogonal in the time domain, the number of subcarriers may be three or more.

As described above, the first method causes the PTRS of the multiple terminal apparatuses 1 to be mapped to resource elements at mutually different time positions for a same frequency position. The time position may be configured by the base station apparatus 3, and may be configured, activated, or indicated via RRC, MAC, or DCI. Furthermore, the time position may be determined based on information for indicating a unique ID of the terminal apparatus 1, and Cell-Radio Network Temporary Identifier (C-RNTI), scramble ID, user-specific ID, PTRS ID, or the like, may be used as the information for indicating the unique ID of the terminal apparatus 1. For example, the time position of the resource element to which PTRS is mapped may be defined by an output generated by using pseudo-random codes (e.g., M-sequence, Gold-sequence, PN-sequence, and the like) initialized by the C-RNTI. Accordingly, the time position is uniquely determined based on the C-RNTI, and therefore the base station apparatus 3 and the terminal apparatus 1 determine the time positions of the PTRS based on the C-RNTI. As described above, the time position of the resource element to which the PTRS is mapped may be determined by using the unique ID of the terminal apparatus 1.

The information for indicating the unique ID of the terminal apparatus 1 may be information for uniquely identifying the terminal apparatus 1. The information for indicating the unique ID of the terminal apparatus 1 may be configured by the base station apparatus 3, and may be configured, activated, or indicated via RRC, MAC, or DCI, or the like. Furthermore, the C-RNTI may be defined as a user ID for performing unicast data communication. Moreover, the C-RNTI may be allocated from the base station apparatus 3 during a random access procedure. Furthermore, the unique ID of the terminal apparatus 1 may be Temporaly C-RNTI or RA-RNTI (Random Access-Radio Network Temporary Identifier).

During the random access procedure, Temporaly C-RNTI or RA-RNTI may be used as the unique ID of the terminal apparatus 1. The terminal apparatus 1 may assume a fixed PTRS pattern during the random access procedure. Here, the fixed PTRS pattern may be a pattern determined in advance based on MCS and/or a scheduled bandwidth, for example. The information for indicating the above-described unique ID of the terminal apparatus 1 may be similarly applied to methods other than the first method.

Furthermore, the above-described scramble ID, user-specific ID, and PTRS ID may be associated with the ID of the DMRS. For example, in a case that a scramble ID has been notified to generate a DMRS, the scramble ID may be defined as a scramble ID to be used to determine resources (time, frequency, code, and the like) of the PTRS.

Here, FIG. 11-1a and FIG. 11-1b may be defined as different PTRS patterns or, alternatively, with FIG. 11-1a being defined as a pattern, FIG. 11-1b may be defined as the pattern in which the positions of the resource elements are shifted from those of FIG. 11-1a in time according to a C-RNTI, a user-specific ID, or the like. In other words, FIG. 11-1a and FIG. 11-1b may be defined as a same pattern in the above-described case. Furthermore, the same can be said for FIG. 11-2 and FIG. 11-3, or for FIG. 8, FIG. 9, and FIG. 10.

Furthermore, information for indicating zero power may be configured, and may be configured, activated, or indicated via RRC, MAC, or DCI. The information for indicating zero power is a piece of information for indicating the position of the resource element at which a transmission with the transmission power configured to zero is indicated. In the case of FIG. 8-1, for example, the information for indicating zero power of the terminal apparatus 1A is a piece of information for indicating the position of the PTRS of the terminal apparatus 1B, and the information for indicating zero power of the terminal apparatus 1B is a piece of information for indicating the position of the PTRS of the terminal apparatus 1A. Furthermore, in the case of FIG. 8-3, for example, the information for indicating zero power of the terminal apparatus 1A is a piece of information for indicating the position of the PTRS of the terminal apparatus 1B and the position of the PTRS of the terminal apparatus 1C, the information for indicating zero power of the terminal apparatus 1B is a piece of information for indicating the position of the PTRS of the terminal apparatus 1A and the position of the PTRS of the terminal apparatus 1C, and the information for indicating zero power of the terminal apparatus 1C is a piece of information for indicating the position of the PTRS of the terminal apparatus 1A and the position of the PTRS of the terminal apparatus 1B. The information for indicating zero power may be the position at which the PTRS are mapped (e.g., subcarrier number (index) and/or time symbol number (index), and the like), may be the density of the PTRS mapping (e.g., continuously, every other subcarrier, every multiple subcarriers, every other time symbol, every multiple time symbols, ratio of the PTRS relative to the number of subcarriers in a single resource block, ratio of the PTRS relative to the number of time symbols within a single resource block, and the like), or may be a combination of the position at which the PTRS are mapped and the density of the PTRS mapping (e.g., a combination of the subcarrier number and the density in the time domain, and the like). The above-described information for indicating zero power may be similarly applied to a method other than the first method.

Figure 12:
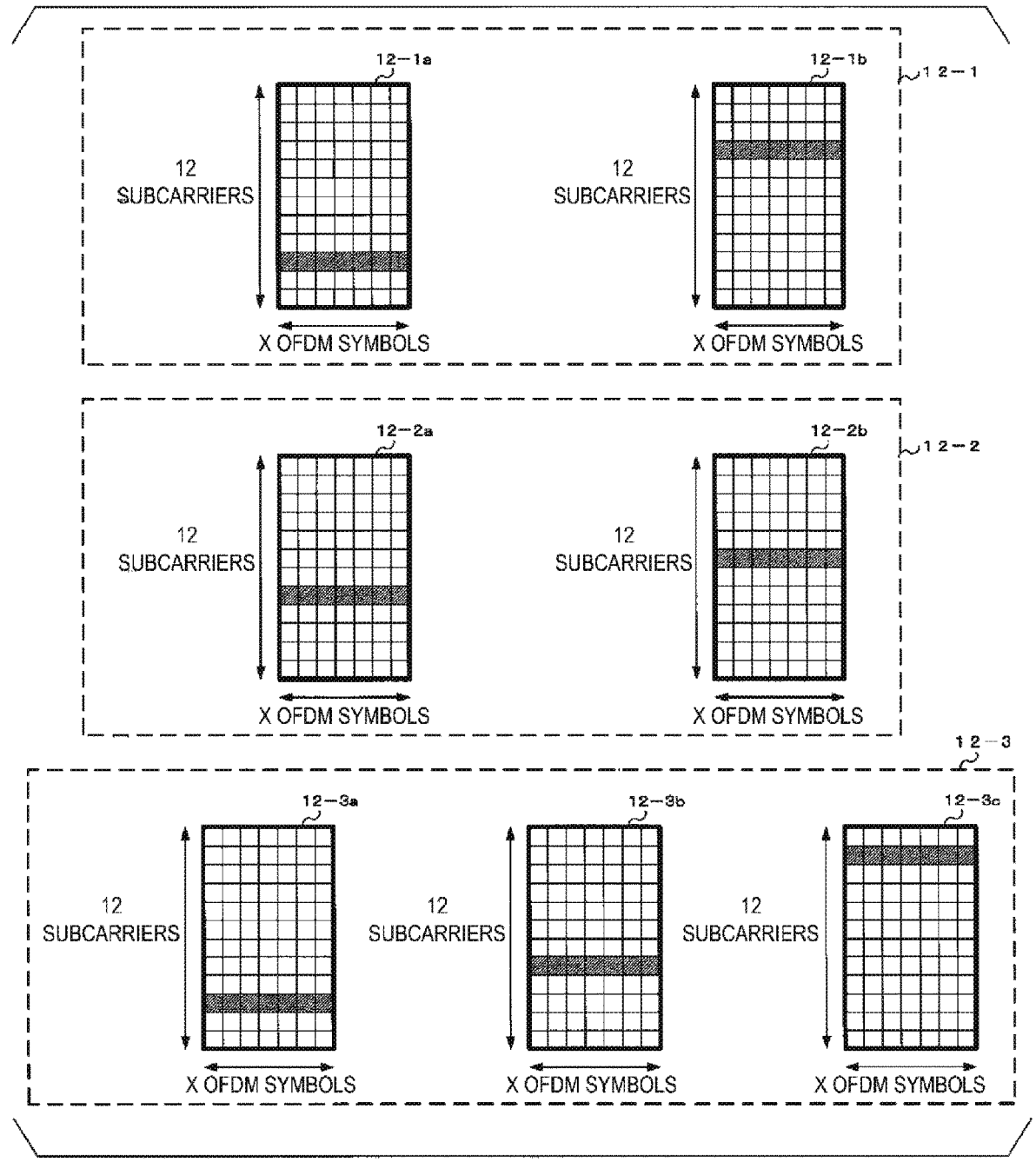
FIG. 12 is a diagram illustrating a first example of PTRS mapping according to a second method in the present embodiment.

FIG. 12 is a diagram illustrating a first example of PTRS mapping according to a second method in the present embodiment. FIG. 12-1 and FIG. 12-2 are examples of the PTRS mapping for each terminal apparatus 1 in a case that two terminal apparatuses 1 are communicating by using a same radio resource. FIG. 12-3 is an example of PTRS mapping for each terminal apparatus 1 in a case that three terminal apparatuses 1 are communicating by using a same radio resource. FIG. 12 is an example of mapping the PTRS of each of the multiple terminal apparatuses 1 at a different frequency position. Here, the second method is a method for configuring the mapping of the PTRS of the multiple terminal apparatuses 1 communicating by using a same resource at different frequency positions. In other words, the second method is a method for causing the PTRS of the multiple terminal apparatuses 1 to be orthogonal in the frequency domain.

In a case that, for example, the terminal apparatus 1A and the terminal apparatus 1B are communicating by using a same radio resource, the PTRS of the terminal apparatus 1A may be mapped as illustrated in FIG. 12-1a, and the PTRS of the terminal apparatus 1B may be mapped as illustrated in FIG. 12-1b. Furthermore, in a case that, for example, the terminal apparatus 1A and the terminal apparatus 1B are communicating by using a same radio resource, the PTRS of the terminal apparatus 1A may be mapped as illustrated in FIG. 12-2a, and the PTRS of the terminal apparatus 1B may be mapped as illustrated in FIG. 12-2b. As can be seen in FIG. 12-1 and FIG. 12-2, the PTRS of the terminal apparatus 1A and the PTRS of the terminal apparatus 1B are each mapped in resource elements at a frequency position which is different from each other. Furthermore, in a case that, for example, the terminal apparatus 1A, the terminal apparatus 1B, and the terminal apparatus 1C are communicating by using a same radio resource, the PTRS of the terminal apparatus 1A may be mapped as illustrated in FIG. 12-3a, the PTRS of the terminal apparatus 1B may be mapped as illustrated in FIG. 12-3b, and the PTRS of the terminal apparatus 1C may be mapped as illustrated in FIG. 12-3c. As described above, in FIG. 12-3, the PTRS of the terminal apparatus 1A, the PTRS of the terminal apparatus 1B, and the PTRS of the terminal apparatus 1C are each mapped in resource elements at a frequency position which is different from each other.

In FIG. 12, the number of terminal apparatuses 1 communicating by using a same radio resource may be four or more, and the frequency position of the PTRS mapped for each terminal apparatus 1 is not limited to that of FIG. 12. Furthermore, although the time positions at which PTRS are mapped are continuous in the time direction in FIG. 12, the PTRS may be mapped at every other time symbol, or every multiple time symbols.

Figure 13:
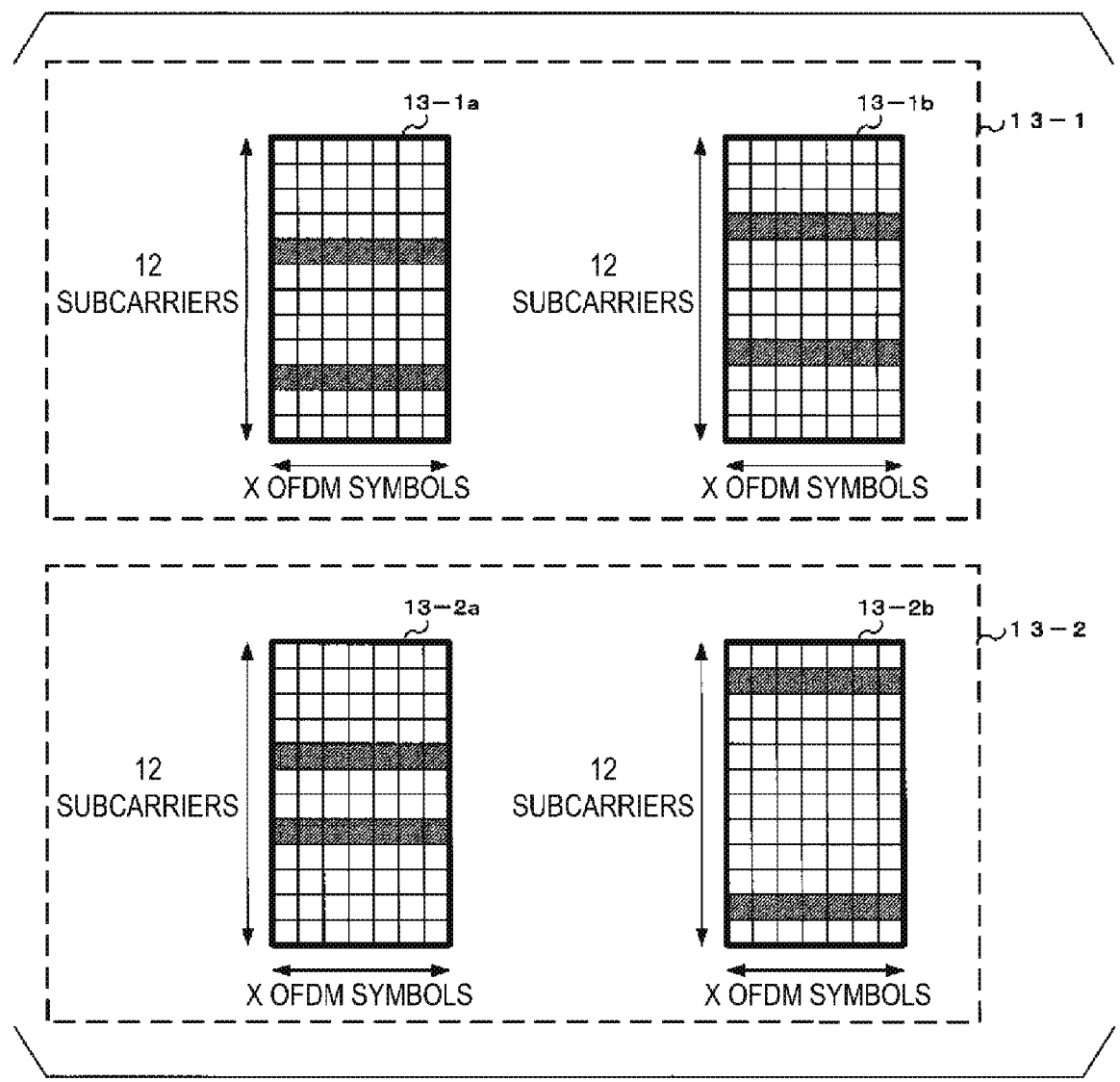
FIG. 13 is a diagram illustrating a second example of PTRS mapping according to the second method in the present embodiment.

FIG. 13 is a diagram illustrating a second example of PTRS mapping according to the second method in the present embodiment. FIG. 13 is an example of mapping the PTRS of each of the multiple terminal apparatuses 1 at two different frequency positions. FIG. 13-1 and FIG. 13-2 are examples of the PTRS mapping for each terminal apparatus 1 in a case that two terminal apparatuses 1 are communicating by using a same radio resource.

In a case that, for example, the terminal apparatus 1A and the terminal apparatus 1B are communicating by using a same radio resource, the PTRS of the terminal apparatus 1A may be mapped as illustrated in FIG. 13-1a, and the PTRS of the terminal apparatus 1B may be mapped as illustrated in FIG. 13-1b. Furthermore, in a case that, for example, the terminal apparatus 1A and the terminal apparatus 1B are communicating by using a same radio resource, the PTRS of the terminal apparatus 1A may be mapped as illustrated in FIG. 13-2a, and the PTRS of the terminal apparatus 1B may be mapped as illustrated in FIG. 13-2b. As can be seen in FIG. 13-1 and FIG. 13-2, the PTRS of the terminal apparatus 1A and the PTRS of the terminal apparatus 1B are each mapped in resource elements at a frequency position which is different from each other.

In FIG. 13, the number of terminal apparatuses 1 communicating by using a same radio resource may be two or more, and the frequency position of the PTRS mapped for each terminal apparatus 1 is not limited to that of FIG. 13. Furthermore, although the time positions at which PTRS are mapped are continuous in the time direction in FIG. 13, the PTRS may be mapped at every other time symbol, or every multiple time symbols. Moreover, the interval in the time direction at which the PTRS are mapped need not be a constant and identical interval, and the PTRS may be mapped with multiple intervals being combined.

As described above, the second method causes the PTRS of the multiple terminal apparatuses 1 communicating simultaneously to be mapped in resource elements at mutually different frequency positions according to the second method. The frequency position may be configured by the base station apparatus 3, and may be configured, activated, or indicated via RRC, MAC, or DCI. Furthermore, the frequency position may be determined based on information for indicating the unique ID of the terminal apparatus 1, and C-RNTI, scramble ID, user-specific ID, PTRS ID, or the like, may be used as the information for indicating the unique ID of the terminal apparatus 1. For example, the frequency position of the resource element to which PTRS are mapped may be defined by an output generated by using pseudo-random codes (e.g., M-sequence, Gold-sequence, PN-sequence, and the like) initialized by the C-RNTI. Accordingly, the frequency position is uniquely determined based on the C-RNTI, and therefore the base station apparatus 3 and the terminal apparatus 1 determine the frequency position of the PTRS based on the C-RNTI. As described above, the frequency position of the resource element to which the PTRS is mapped may be determined by using the unique ID of the terminal apparatus 1. Furthermore, information for indicating zero power may be configured, and may be configured, activated, or indicated via RRC, MAC, or DCI.

Moreover, the above-described scramble ID, user-specific ID, and PTRS ID may be associated with the ID of the DMRS. For example, in a case that a scramble ID has been notified to generate a DMRS, the scramble ID may be defined as a scramble ID to be used to determine resources (time, frequency, code, and the like) of the PTRS.

Here, FIG. 12-1a and FIG. 12-1b may be defined as different PTRS patterns or, alternatively, with FIG. 12-1a being defined as a pattern, FIG. 12-1b may be defined as the pattern with a resource element being shifted from that of FIG. 12-1a in frequency according to a C-RNTI, a user-specific ID, or the like. In other words, FIG. 12-1a and FIG. 12-1b may be defined as a same pattern. The same can be said for FIG. 12-2, FIG. 12-3, FIG. 13-1, and FIG. 13-2.

Figure 14:
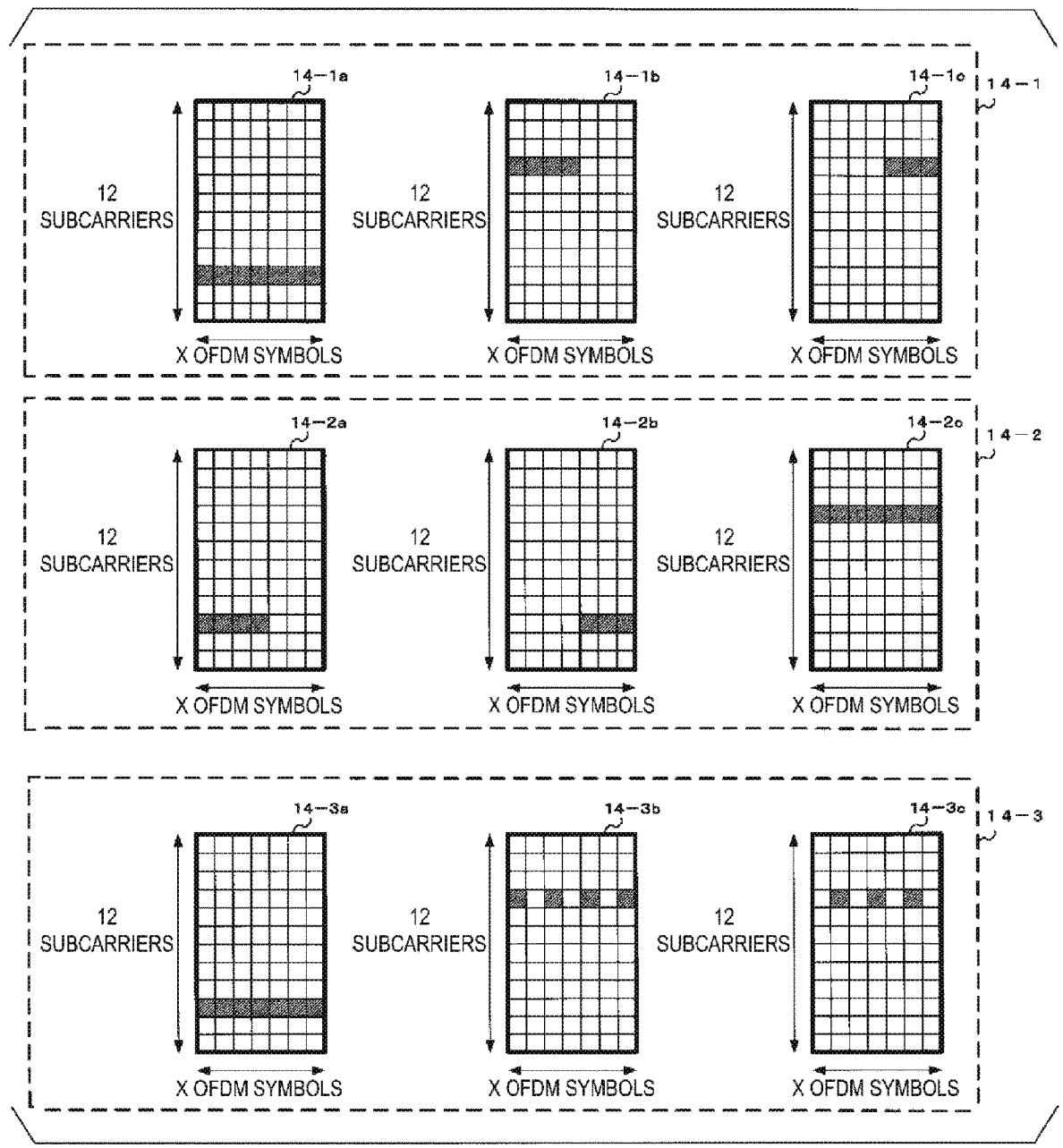
FIG. 14 is a diagram illustrating an example of PTRS mapping according to a third method in the present embodiment.

FIG. 14 is a diagram illustrating an example of PTRS mapping according to a third method in the present embodiment. FIG. 14-1, FIG. 14-2, and FIG. 14-3 are examples of the PTRS mapping for each terminal apparatus 1 in a case that three terminal apparatuses 1 are communicating by using a same radio resource. Here, the third method is a method for configuring the mapping of the PTRS of the multiple terminal apparatuses 1 communicating by using a same resource to different frequency positions and time positions. In other words, the third method is a method for causing the mapping of the PTRS of the multiple terminal apparatuses 1 to be orthogonal in the frequency domain and the time domain.

For example, in a case that the terminal apparatus 1A, the terminal apparatus 1B, and the terminal apparatus 1C are communicating by using a same radio resource, the PTRS of the terminal apparatus 1A may be mapped as illustrated in FIG. 14-1a, the PTRS of the terminal apparatus 1B may be mapped as illustrated in FIG. 14-1b, and the PTRS of the terminal apparatus 1C may be mapped as illustrated in FIG. 14-1c. Furthermore, for example, the PTRS of the terminal apparatus 1A is mapped as illustrated in FIG. 14-2a, the PTRS of the terminal apparatus 1B may be mapped as illustrated in FIG. 14-2b, and the PTRS of the terminal apparatus 1C may be mapped as illustrated in FIG. 14-2c. Moreover, for example, the PTRS of the terminal apparatus 1A is mapped as illustrated in FIG. 14-3a, the PTRS of the terminal apparatus 1B may be mapped as illustrated in FIG. 14-3b, and the PTRS of the terminal apparatus 1C may be mapped as illustrated in FIG. 14-3c. As can be seen in FIG. 14, the PTRS of the terminal apparatus 1A, the terminal apparatus 1B, and the terminal apparatus 1C are mapped in resource elements at mutually different frequency positions and time positions.

As described above, the third method causes the PTRS of the multiple terminal apparatuses 1 communicating simultaneously to be mapped in resource elements at mutually different frequency positions and time positions. In FIG. 14, the number of terminal apparatuses 1 communicating by using a same radio resource may be four or more, and the frequency position and the time position of the PTRS mapped for each terminal apparatus 1 are not limited to that of FIG. 14. Furthermore, the time positions at which the PTRS are mapped may be continuous in time direction, may be mapped at every other time position, at any interval, or at every multiple time positions, and the positions of the PTRS of the terminal apparatuses 1 are required to be orthogonal to each other. Furthermore, the frequency position and the time position may be determined based on information for indicating the unique ID of the terminal apparatus 1, and for example, C-RNTI, scramble ID, user-specific ID, PTRS ID, and the like may be used as the information for indicating the unique ID of the terminal apparatus 1. For example, the frequency position and the time position of the resource element to which PTRS are mapped may be defined by an output generated by using pseudo-random codes (e.g., M-sequence, Gold-sequence, PN-sequence, and the like) initialized by the C-RNTI. Accordingly, the frequency position and the time position are uniquely determined based on the C-RNTI, and therefore the base station apparatus 3 and the terminal apparatus 1 determine the frequency position and the time position of the PTRS based on the C-RNTI. As described above, the frequency position and the time position of the resource element to which the PTRS is mapped may be determined by using the unique ID of the terminal apparatus 1. Furthermore, information for indicating zero power may be configured, and may be configured, activated, or indicated via RRC, MAC, or DCI.

Moreover, the above-described scramble ID, user-specific ID, and PTRS ID may be associated with the ID of the DMRS. For example, in a case that a scramble ID has been notified to generate a DMRS, the scramble ID may be defined as a scramble ID to be used to determine resources (time, frequency, code, and the like) of the PTRS.

A fourth method may cause the PTRS of multiple terminal apparatuses 1 communicating simultaneously to be orthogonal. Here, the fourth method is a method that maps, at a same position, the PTRS of the multiple terminal apparatuses 1 communicating by using a same radio resource, and that causes the PTRS to be orthogonal, pseudo-orthogonal, or scrambled by encoding or scrambling the PTRS. On this occasion, for example, codes such as orthogonal codes, pseudo-random codes (M sequence, Gold-sequence, PN-sequence, and the like) may be used. The coded or scrambled sequence may be configured, activated, or indicated via RRC, MAC, or DCI. Furthermore, an index number may be associated with the coded or scrambled sequence in advance, and the index number may be configured, activated, or indicated via RRC, MAC, or DCI.

The PTRS pattern may be the position at which the PTRS are mapped (e.g., subcarrier number (index) and/or time symbol number (index)), may be defined by the density of the PTRS mapping (e.g., continuously, every other subcarrier, every multiple subcarriers, every other time symbol, every multiple time symbols, ratio of the PTRS relative to the number of subcarriers in a single resource block, ratio of the PTRS relative to the number of time symbols in a single resource block), or may be defined by a combination of the position at which the PTRS are mapped and the density of the PTRS mapping (e.g., a combination of the subcarrier number and the density in the time domain). The density in the time domain and/or frequency domain may be configured by MCS. Furthermore, the density in the time domain and/or the frequency domain may be configured based on the scheduled bandwidth (scheduled BW), or may be configured based on the scheduled BW and MCS.

Moreover, the density in the time domain and the density in the frequency domain may be configured based on multiple conditions. The multiple conditions may be at least one condition to be selected from frequency band, scheduled bandwidth, MCS, modulation scheme, wireless transmission method, and/or movement speed of terminal apparatus, and the like. Furthermore, the pattern in the frequency direction may be mapping on a single subcarrier, discontinuous and distributed mapping by using multiple subcarriers, or continuous mapping on multiple subcarriers. Furthermore, there may be a case that no PTRS is configured. The case that no PTRS is configured may be indicated by information for indicating presence or absence of the PTRS, or may be defined as a pattern for indicating that no PTRS is included. The presence or absence of the PTRS and/or the pattern of the PTRS may be configured, activated, or indicated via RRC, MAC, or DCI. The PTRS patterns may be different or identical, depending on the wireless transmission method.

The wireless transmission method may be configured, activated, or indicated via RRC, MAC, or DCI. As described above, the terminal apparatus 1 may map the PTRS, taking into account the wireless transmission method notified by the base station apparatus 3.

In a case of a transmission by using multiple antennas, the PTRS may be caused to be orthogonal between antenna ports. Furthermore, in the terminal apparatus 1, at least one of the ports of the DMRS and the antenna port for transmitting the PTRS may be identical. For example, in a case that the number of antenna ports of the DMRS is two, and the number of antenna ports of the PTRS is one, one or both of the antenna ports of the DMRS may be identical to the antenna port of the PTRS. The antenna ports of the DMRS and the PTRS may be assumed to be quasi co-located (QCL). For example, the frequency offset due to phase noise of the DMRS is inferred from the frequency offset compensated by the PTRS. Furthermore, regardless of whether or not the PTRS is mapped, DMRS may be constantly transmitted.

In the terminal apparatus 1, a PUSCH signal may not be mapped to resource elements to which the PTRS are mapped. In other words, in a case that no PUSCH signal is mapped, a rate match may be applied that causes the resource element to which the PTRS is mapped to be a resource element to which no PUSCH signal may be mapped. Furthermore, although a PUSCH signal may be mapped to a resource element to which the PTRS is mapped, the PUSCH signal may be overwritten by the PTRS. In this case, the base station apparatus 3 may perform a demodulation process, assuming that data is allocated in the resource element to which the PTRS is mapped.

Processes to be performed by the base station apparatus 3 and the terminal apparatus 1 according to the present embodiment will be described below. Here, processes mainly related to the PTRS configuration will be described. The present embodiment is applied similarly to a case that three or more terminal apparatuses 1 are allocated to a same resource, description of which is omitted.

An example operation of the base station apparatus 3 in a case that the CP-OFDM wireless transmission method is applied in downlink transmission will be described. The base station apparatus 3 performs scheduling, and configure the pattern of the PTRS for the scheduled terminal apparatus 1. In a case that the multiple terminal apparatuses 1 are allocated to a same resource, the base station apparatus 3 configures the pattern of the PTRS for each of the terminal apparatuses 1. It is assumed here as an example that two terminal apparatuses 1 (terminal apparatus 1A and terminal apparatus 1B) are allocated to a same resource. The base station apparatus 3 may configure the density of the PTRS and configure the pattern of the PTRS based on the configured density and/or a corresponding pattern which has been defined in advance. The information for indicating the unique ID of the terminal apparatus 1 may be configured by the base station apparatus 3, and may be configured, activated, or indicated via RRC, MAC, DCI, or the like.

As an example, a case is assumed that configures the density in the frequency domain for the two terminal apparatuses 1 to one in a resource block, and configures the density in the time domain to half the number of time symbols in a single resource block. The base station apparatus 3 may configure, by using the first method, the PTRS of the terminal apparatus 1A as illustrated in FIG. 8-1a and the PTRS of the terminal apparatus 1B as illustrated in FIG. 8-1b, or the PTRS of the terminal apparatus 1A as illustrated in FIG. 10-1a and the PTRS of the terminal apparatus 1B as illustrated in FIG. 10-1b. Furthermore, the base station apparatus 3 may configure the PTRS of the terminal apparatus 1A and the terminal apparatus 1B as illustrated in FIG. 8-1a or FIG. 10-1a, and determine the time position of the PTRS (or the shift or offset of time position with respect to FIG. 8-1a or FIG. 10-1a) for each terminal apparatus 1, based on the information for indicating the unique ID of the terminal apparatus 1. For example, C-RNTI may be initialized by a pseudo-random code, and the value of the initialized pseudo-random sequence may be associated with the time position. On this occasion, the pseudo-random codes may be designed such that the pattern of the pseudo-random sequence matches the density in the time domain.

Furthermore, as an example, a case is assumed that configures the density in the frequency domain for the two terminal apparatuses 1 to one in a resource block, and configures the density in the time domain to continuity. The base station apparatus 3 may configure, by using the second method, the PTRS of the terminal apparatus 1A as illustrated in FIG. 12-1a and the PTRS of the terminal apparatus 1B as illustrated in FIG. 12-1b. Furthermore, the base station apparatus 3 may configure the PTRS of the terminal apparatus 1A and the terminal apparatus 1B as illustrated in FIG. 12-1a, and determine the frequency position of the PTRS (or the shift or offset of frequency position with respect to FIG. 12-1a) for each terminal apparatus 1, based on the information for indicating the unique ID of the terminal apparatus 1. For example, C-RNTI may be initialized by a pseudo-random code, and the value of the initialized pseudo-random sequence may be associated with the frequency position.

Furthermore, as an example, a case is assumed that configures the density in the frequency domain for the three terminal apparatuses 1 to one in the resource block. The base station apparatus 3 may configure, by using the third method, the PTRS of the terminal apparatus 1A as illustrated in FIG. 14-1a, the PTRS of the terminal apparatus 1B as illustrated in FIG. 14-1b, and the PTRS of the terminal apparatus 1C as illustrated in FIG. 14-1c. Furthermore, the base station apparatus 3 may configure the PTRS of the terminal apparatus 1A, the terminal apparatus 1B, and the terminal apparatus 1C as illustrated in FIG. 14-1a, and determine the frequency position of the PTRS (or the shift or offset of frequency position with respect to FIG. 14-1a) for each terminal apparatus 1 and the time position (or the shift or offset of time position with respect to FIG. 14-1a), based on the information for indicating the unique ID of the terminal apparatus 1.

In the first, the second, and the third methods, there may be a part where the PTRS of the multiplexed terminal apparatuses 1 are not orthogonal to each other, in a case that the position of the PTRS is determined based on the information for indicating the unique ID of the terminal apparatus 1.

The base station apparatus 3 may configure the transmission power of the specified resource block to zero, based on the information for indicating zero power.

Furthermore, the base station apparatus 3 may configure the PTRS of the terminal apparatus 1A and the terminal apparatus 1B to a same pattern by using the fourth method, and cause the PTRS to be orthogonal, pseudo-orthogonal or scrambled by encoding or scrambling the PTRS. On this occasion, for example, the index number associated with the coded or scrambled sequence, as the coded index number, may be configured, activated, or indicated via RRC, MAC, or DCI.

The PTRS configuration method (the first, the second, the third, or the fourth method) may be configured, activated, or indicated via RRC, MAC, or DCI. On this occasion, the pattern configured for each terminal apparatus 1 may be configured, activated, or indicated via RRC, MAC, or DCI.

An example operation of the terminal apparatus 1 in a case that the CP-OFDM wireless transmission method is applied in downlink transmission will be described. The terminal apparatus 1 receives the signal transmitted from the base station apparatus 3, determines a pattern of the PTRS, and tracks phase noise by using the PTRS. For example, the terminal apparatus 1 may determine the pattern of the PTRS via a similar procedure to that of the PTRS configuration rule in the base station apparatus 3, or may determine the pattern of the PTRS by using the information notified via DCI. For example, the density of the PTRS may be determined by using MCS and/or the scheduled bandwidth, and the like.

The terminal apparatus 1 may determine the position of the PTRS by using information for indicating the unique ID of the terminal apparatus 1 and/or the coded index number and/or the configuration method of the PTRS, and the like. In the case of the first method, for example, the terminal apparatus 1 may initialize the C-RNTI by using the pseudo-random code, and configure the time position (or the shift of the time position) associated with the value of the initialized pseudo-random sequence as the time position of the PTRS. In the case of the second method, for example, the terminal apparatus 1 may initialize the C-RNTI by using the pseudo-random code, and configure the frequency position (or the shift or offset of the frequency position) associated with the value of the initialized pseudo-random sequence as the frequency position of the PTRS. In the case of the third method, for example, the terminal apparatus 1 may initialize the C-RNTI by using the pseudo-random code, and configure the frequency position (or the shift or offset of the frequency position) and the time position (or the shift or offset of the time position) associated with the value of the initialized pseudo-random sequence as the frequency position and the time position of the PTRS. In the case of the fourth method, for example, the terminal apparatus 1 may determine the PTRS associated with the coded index number based on the coded index number. In a case that multiple methods for configuring the PTRS are introduced in the communication system, the terminal apparatus 1 may determine the PTRS configuration method which has been configured or activated in the base station apparatus 3, and perform the above-described process based on the determined PTRS configuration method.

An example operation of the base station apparatus 3 in a case that the CP-OFDM wireless transmission method is applied in uplink transmission will be described. The base station apparatus 3 receives the signal transmitted from the terminal apparatus 1, and tracks phase noise by using the PTRS. Furthermore, the base station apparatus 3 performs scheduling, and configures information required for configuring the PTRS for the terminal apparatus 1 to perform transmission in the uplink. The information required for configuring the PTRS may include, for example, the time position (or the shift or offset of the time position) of the PTRS and/or the frequency position (or the shift or offset of the frequency position) of the PTRS and/or the information for indicating zero power and/or the configuration method of the PTRS, and the like. Furthermore, in a case that the multiple terminal apparatuses 1 are allocated to a same resource and the fourth method is applied, the index number associated with the coded or scrambled sequence may be configured, activated, or indicated via RRC, MAC, or DCI as the coded index number. Moreover, the information for indicating zero power may be configured, activated, or indicated via RRC, MAC, or DCI. The information for indicating the unique ID of the terminal apparatus 1 may be configured by the base station apparatus 3, and may be configured, activated, or indicated via RRC, MAC, DCI, or the like.

An example operation of the terminal apparatus 1 in a case that the CP-OFDM wireless transmission method is applied in uplink transmission will be described. The terminal apparatus 1 configures the pattern of the PTRS for the terminal apparatus 1 to perform transmission in the uplink, based on the information configured in the base station apparatus 3. The terminal apparatus 1 may configure the pattern of the PTRS by using the information notified via DCI. For example, the terminal apparatus 1 may configure the density of the PTRS by using the MCS and/or the scheduled bandwidth, and the like.

Furthermore, the terminal apparatus 1 may configure the position (or the shift or offset of the position) of the PTRS by using the information for indicating the unique ID of the terminal apparatus 1 and/or the information for indicating zero power and/or the coded index number, and/or the configuration method of the PTRS. In the case of the first method, for example, the terminal apparatus 1 may initialize the C-RNTI by using the pseudo-random code, and may configure the time position (or the shift or offset of the time position) associated with the value of the initialized pseudo-random sequence as the time position of the PTRS. In the case of the second method, for example, the terminal apparatus 1 may initialize the C-RNTI by using the pseudo-random code, and configure the frequency position (or the shift or offset of the frequency position) associated with the value of the initialized pseudo-random sequence as the frequency position of the PTRS. In the case of the third method, for example, the terminal apparatus 1 may initialize the C-RNTI by using the pseudo-random code, and configure the frequency position (or the shift or offset of the frequency position) and the time position (or the shift or offset of the time position) associated with the value of the initialized pseudo-random sequence as the frequency position and the time position of the PTRS. Additionally, in the case of the fourth method, for example, the terminal apparatus 1 configures the PTRS associated with the coded index number based on the coded index number.

In a case that multiple methods for configuring the PTRS are introduced in the communication system, the terminal apparatus 1 may determine the PTRS configuration method which has been configured or activated in the base station apparatus 3, and perform the above-described process based on the determined PTRS configuration method. The terminal apparatus 1 may configure the transmission power of the specified resource block to zero, based on the information for indicating zero power.

An example operation of the base station apparatus 3 and the terminal apparatus 1 in a case that the DFTS-OFDM (SC-FDM) wireless transmission method is applied in uplink transmission will be described. Here, description is provided focusing on the difference from the case of applying CP-OFDM in uplink transmission.

In the case of DFTS-OFDM, the terminal apparatus 1 may insert a PTRS symbol at a specific time position before input to DFT. For example, in a case that mapping to the resource element is performed in a frequency-first manner, and the number of the scheduled PRB is four (equivalent to 60 modulation symbols), the PTRS may be inserted into the 6-th, 18(12+6)-th, 30(12*2+6)-th, and 42(12*3+6)-th time symbols to be input to DFT for generating each DFTS-OFDM symbol, and may be DFT-spread. Furthermore, mapping to the resource element may be performed in a time-first manner, and the PTRS may be inserted into the first X symbols and DFT-spread. The PTRS may be inserted into the X symbol in specific DFTS-OFDM symbols in the slot, and may be DFT-spread. X may be the number of DFTS-OFDM symbols included in the slot. Furthermore, the PTRS symbols may be mapped with a specific pattern before DFT. Moreover, the PTRS may be mapped to time and/or frequency after DFT-spread. Additionally, the PTRS pattern to be input before DFT may be determined according to the ID specified by C-RNTI or DCI, or the like.

An aspect of the present embodiment may be operated in carrier aggregation or dual connectivity with the Radio Access Technologies (RAT) such as LTE and LTE-A/LTE-A Pro. In this case, the aspect may be used for some or all of the cells or cell groups, or the carriers or carrier groups (e.g., Primary Cells (PCells), Secondary Cells (SCells), Primary Secondary Cells (PSCells), Master Cell Groups (MCGs), or Secondary Cell Groups (SCGs)). Moreover, the aspect may be independently operated and used in a stand-alone manner.

Configurations of apparatuses according to the present embodiment will be described below. Here, an example is described for a case of applying CP-OFDM as the downlink wireless transmission method, and CP-OFDM or DFTS-OFDM (SC-FDM) as the uplink wireless transmission method.

Figure 6:
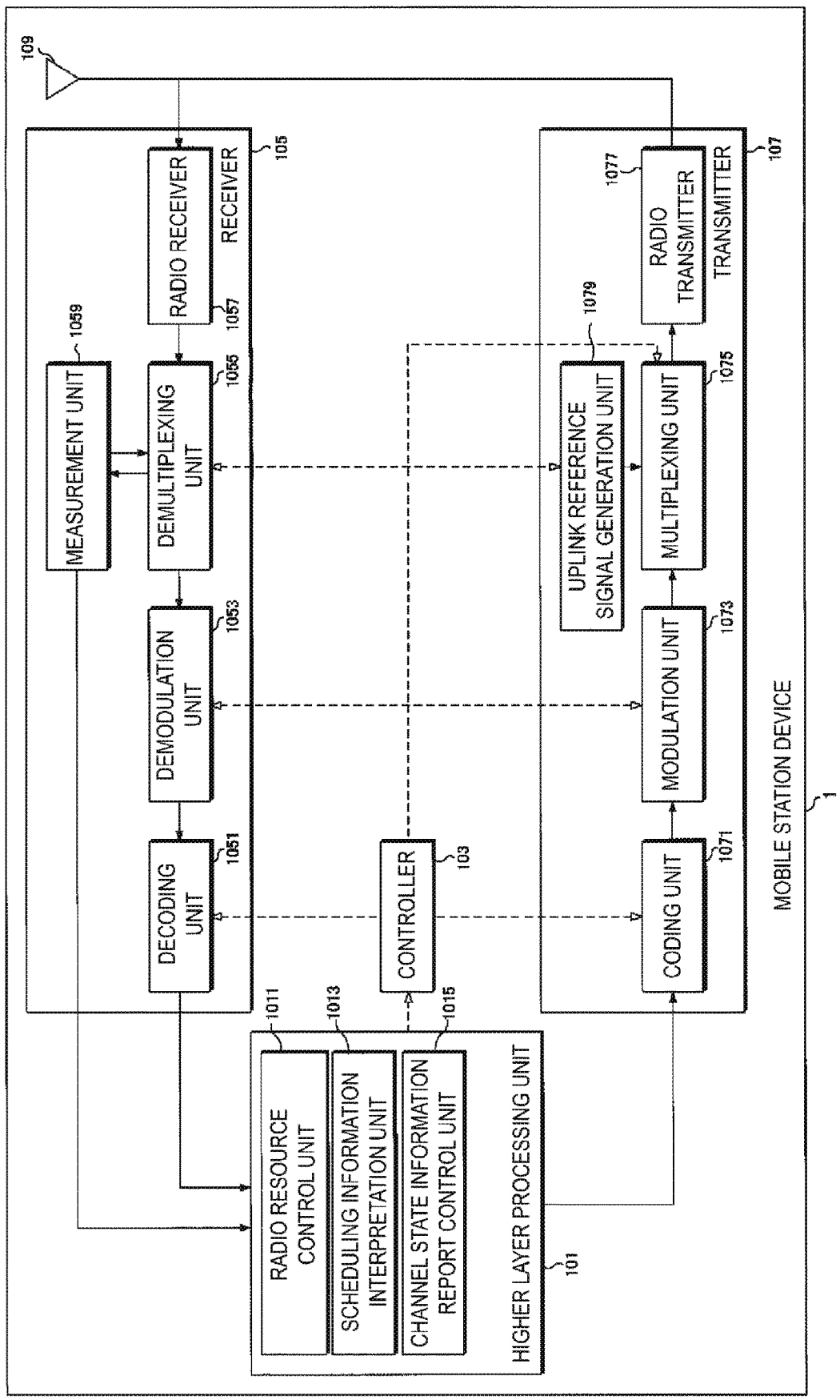
FIG. 6 is a schematic block diagram illustrating a configuration of a terminal apparatus 1 according to the present embodiment.

FIG. 6 is a schematic block diagram illustrating a configuration of the terminal apparatus 1 according to the present embodiment. As illustrated, the terminal apparatus 1 is configured to include a higher layer processing unit 101, a controller 103, a receiver 105, a transmitter 107, and a transmit and/or receive antenna 109. Furthermore, the higher layer processing unit 101 is configured to include a radio resource control unit 1011, a scheduling information interpretation unit 1013, and a Channel State Information (CSI) report control unit 1015. Furthermore, the receiver 105 is configured to include a decoding unit 1051, a demodulation unit 1053, a demultiplexing unit 1055, a radio receiver 1057, and a measurement unit 1059. The transmitter 107 is configured to include a coding unit 1071, a modulation unit 1073, a multiplexing unit 1075, a radio transmitter 1077, and an uplink reference signal generation unit 1079.

The higher layer processing unit 101 outputs the uplink data (the transport block) generated by a user operation or the like, to the transmitter 107. The higher layer processing unit 101 performs processing of the Medium Access Control (MAC) layer, the Packet Data Convergence Protocol (PDCP) layer, the Radio Link Control (RLC) layer, and the Radio Resource Control (RRC) layer.

The radio resource control unit 1011 included in the higher layer processing unit 101 manages various pieces of configuration information of the terminal apparatus 1. Furthermore, the radio resource control unit 1011 generates information to be mapped to each uplink channel, and outputs the generated information to the transmitter 107.

The scheduling information interpretation unit 1013 included in the higher layer processing unit 101 interprets the DCI (scheduling information) received through the receiver 105, generates control information for control of the receiver 105 and the transmitter 107, in accordance with a result of interpreting the DCI, and outputs the generated control information to the controller 103.

The CSI report control unit 1015 indicates to the measurement unit 1059 to derive Channel State Information (RI/PMI/CQI/CRI) relating to the CSI reference resource. The CSI report control unit 1015 indicates to the transmitter 107 to transmit RI/PMI/CQI/CRI. The CSI report control unit 1015 sets a configuration that is used in a case that the measurement unit 1059 calculates CQI.

In accordance with the control information from the higher layer processing unit 101, the controller 103 generates a control signal for control of the receiver 105 and the transmitter 107. The controller 103 outputs the generated control signal to the receiver 105 and the transmitter 107 to control the receiver 105 and the transmitter 107.

In accordance with the control signal input from the controller 103, the receiver 105 demultiplexes, demodulates, and decodes a reception signal received from the base station apparatus 3 through the transmit and/or receive antenna 109, and outputs the decoded information to the higher layer processing unit 101.

The radio receiver 1057 converts (down-converts) a downlink signal received through the transmit and/or receive antenna 109 into a signal of an intermediate frequency, removes unnecessary frequency components, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio receiver 1057 removes a portion corresponding to a Guard Interval (GI) from the digital signal resulting from the conversion, performs Fast Fourier Transform (FFT) on the signal from which the Guard Interval has been removed, and extracts a signal in the frequency domain.

The demultiplexing unit 1055 demultiplexes the extracted signal into the downlink PCCH, the downlink PSCH, and the downlink reference signal. Furthermore, the demultiplexing unit 1055 performs channel compensation for the PCCH and PSCH based on the channel estimate value input from the measurement unit 1059. Furthermore, the demultiplexing unit 1055 outputs the downlink reference signal resulting from the demultiplexing, to the measurement unit 1059.

The demodulation unit 1053 demodulates the downlink PCCH and outputs a signal resulting from the demodulation to the decoding unit 1051. The decoding unit 1051 attempts to decode the PCCH. In a case that the decoding is successful, the decoding unit 1051 outputs downlink control information resulting from the decoding and an RNTI to which the downlink control information corresponds, to the higher layer processing unit 101.

The demodulation unit 1053 demodulates the PSCH in compliance with a modulation scheme, such as Quadrature Phase Shift Keying (QPSK), 16 Quadrature Amplitude Modulation (QAM), 64 QAM, and 256 QAM, that is notified with the downlink grant, and outputs a signal resulting from the demodulation to the decoding unit 1051. The decoding unit 1051 performs decoding in accordance with information of a transmission or an original coding rate notified with the downlink control information, and outputs, to the higher layer processing unit 101, the downlink data (the transport block) resulting from the decoding.

The measurement unit 1059 performs downlink path loss measurement, channel measurement, and/or interference measurement from the downlink reference signal input from the demultiplexing unit 1055. The measurement unit 1059 outputs, to the higher layer processing unit 101, the measurement result and CSI calculated based on the measurement result. Furthermore, the measurement unit 1059 calculates a downlink channel estimate value from the downlink reference signal and outputs the calculated downlink channel estimate value to the demultiplexing unit 1055.

The transmitter 107 generates the uplink reference signal in accordance with the control signal input from the controller 103, codes and modulates the uplink data (the transport block) input from the higher layer processing unit 101, multiplexes the PUCCH, the PUSCH, and the generated uplink reference signal, and transmits a signal resulting from the multiplexing to the base station apparatus 3 through the transmit and/or receive antenna 109.

The coding unit 1071 codes the uplink control information and the uplink data input from the higher layer processing unit 101. The modulation unit 1073 modulates the coded bits input from the coding unit 1071, in compliance with a modulation scheme such as BPSK, QPSK, 16 QAM, 64 QAM, and 256 QAM.

The uplink reference signal generation unit 1079 generates a sequence determined according to a prescribed rule (formula), based on a physical cell identity (also referred to as a Physical Cell Identity (PCI), a cell ID, or the like) for identifying the base station apparatus 3, a bandwidth in which the uplink reference signal is mapped, a cyclic shift notified with the uplink grant, a parameter value for generation of a DMRS sequence, and the like.

Based on the information used for the scheduling of PUSCH, the multiplexing unit 1075 determines the number of PUSCH layers to be spatially-multiplexed, maps multiple pieces of uplink data to be transmitted on the same PUSCH to multiple layers through Multiple Input Multiple Output Spatial Multiplexing (MIMO SM), and performs precoding on the layers.

In accordance with the control signal input from the controller 103, the multiplexing unit 1075 performs Discrete Fourier Transform (DFT) on modulation symbols of the PSCH. Furthermore, the multiplexing unit 1075 multiplexes PCCH and PSCH signals and the generated uplink reference signal for each transmit antenna port. To be more specific, the multiplexing unit 1075 maps the PCCH and PSCH signals and the generated uplink reference signal to the resource elements for each transmit antenna port.

The radio transmitter 1077 performs Inverse Fast Fourier Transform (IFFT) on a signal resulting from the multiplexing to perform modulation in compliance with an SC-FDM scheme, adds the Guard Interval to the SC-FDM-modulated SC-FDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 109 for transmission.

Figure 7:
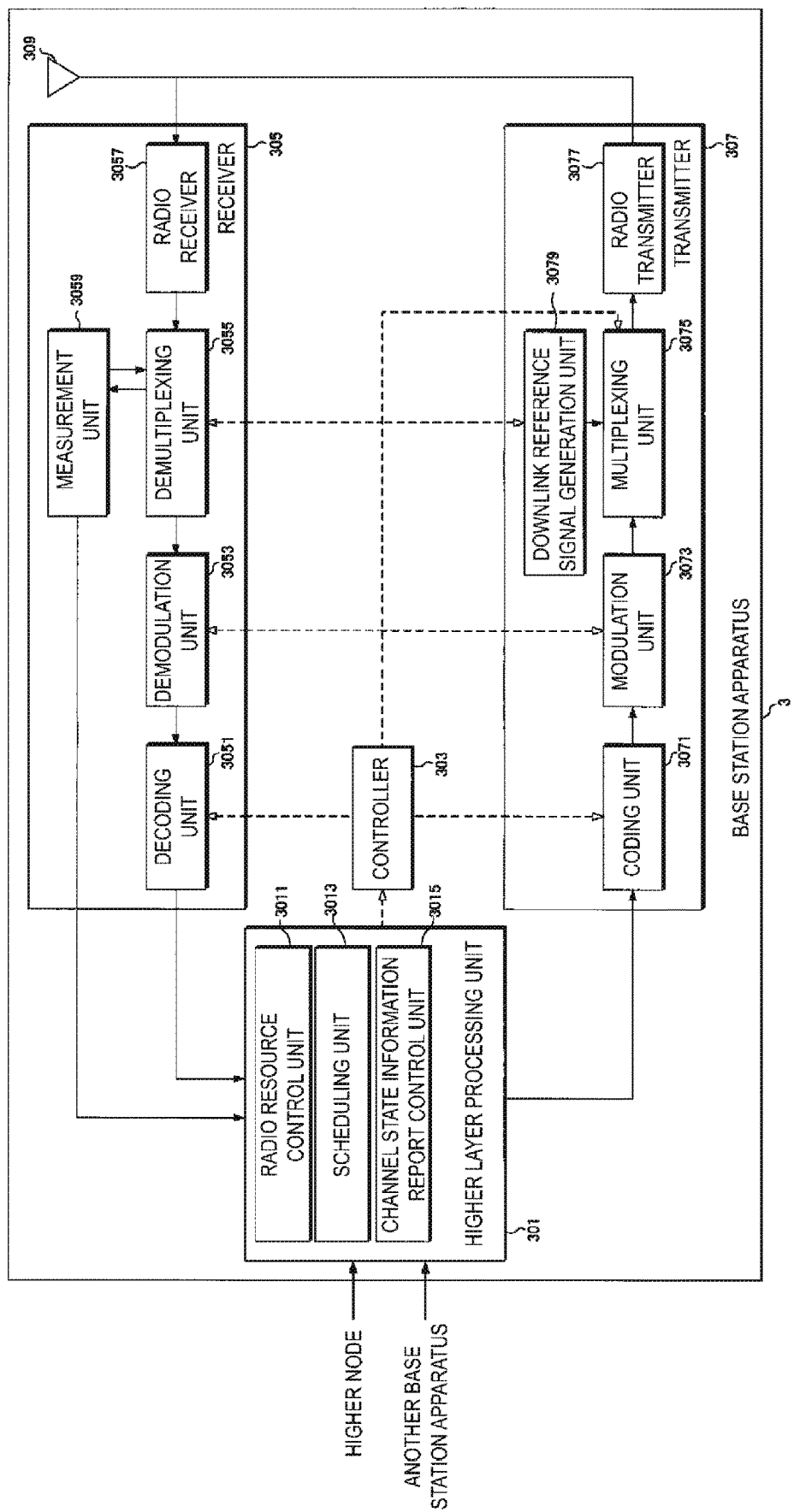
FIG. 7 is a schematic block diagram illustrating a configuration of a base station apparatus 3 according to the present embodiment.

FIG. 7 is a schematic block diagram illustrating a configuration of the base station apparatus 3 according to the present embodiment. As is illustrated, the base station apparatus 3 is configured to include a higher layer processing unit 301, a controller 303, a receiver 305, a transmitter 307, and a transmit and/or receive antenna 309. The higher layer processing unit 301 is configured to include a radio resource control unit 3011, a scheduling unit 3013, and a CSI report control unit 3015. The receiver 305 is configured to include a decoding unit 3051, a demodulation unit 3053, a demultiplexing unit 3055, a radio receiver 3057, and a measurement unit 3059. The transmitter 307 is configured to include a coding unit 3071, a modulation unit 3073, a multiplexing unit 3075, a radio transmitter 3077, and a downlink reference signal generation unit 3079.

The higher layer processing unit 301 performs processing of the Medium Access Control (MAC) layer, the Packet Data Convergence Protocol (PDCP) layer, the Radio Link Control (RLC) layer, and the Radio Resource Control (RRC) layer. Furthermore, the higher layer processing unit 301 generates control information for control of the receiver 305 and the transmitter 307, and outputs the generated control information to the controller 303.

The radio resource control unit 3011 included in the higher layer processing unit 301 generates, or acquires from a higher node, the downlink data (the transport block) mapped to the downlink PSCH, system information, the RRC message, the MAC Control Element (CE), and the like, and outputs a signal resulting from the generation or the acquirement to the transmitter 307. Furthermore, the radio resource control unit 3011 manages various configuration information for each of the terminal apparatuses 1.

The scheduling unit 3013 included in the higher layer processing unit 301 determines a frequency and a subframe to which the physical channel (PSCH) is allocated, the transmission coding rate and modulation scheme for the physical channel (PSCH), the transmit power, and the like, from the received CSI and from the channel estimate value, channel quality, or the like input from the measurement unit 3059. The scheduling unit 3013 generates the control information for control of the receiver 305 and the transmitter 307 in accordance with a result of the scheduling, and outputs the generated information to the controller 303. The scheduling unit 3013 generates the information (e.g., the DCI format) to be used for the scheduling of the physical channel (PSCH), based on the result of the scheduling.

The CSI report control unit 3015 included in the higher layer processing unit 301 controls a CSI report to be performed by the terminal apparatus 1. The CSI report control unit 3015 transmits information, assumed in order for the terminal apparatus 1 to derive RI/PMI/CQI in the CSI reference resource, for indicating various configurations, to the terminal apparatus 1 through the transmitter 307.

Based on the control information from the higher layer processing unit 301, the controller 303 generates a control signal for controlling the receiver 305 and the transmitter 307. The controller 303 outputs the generated control signal to the receiver 305 and the transmitter 307 to control the receiver 305 and the transmitter 307.

In accordance with the control signal input from the controller 303, the receiver 305 demultiplexes, demodulates, and decodes the reception signal received from the terminal apparatus 1 through the transmit and/or receive antenna 309, and outputs information resulting from the decoding to the higher layer processing unit 301. The radio receiver 3057 converts (down-converts) an uplink signal received through the transmit and/or receive antenna 309 into a signal of an intermediate frequency, removes unnecessary frequency components, controls the amplification level in such a manner as to suitably maintain a signal level, performs orthogonal demodulation based on an in-phase component and an orthogonal component of the received signal, and converts the resulting orthogonally-demodulated analog signal into a digital signal.

The radio receiver 3057 removes a portion corresponding to the Guard Interval (GI) from the digital signal resulting from the conversion. The radio receiver 3057 performs Fast Fourier Transform (FFT) on the signal from which the Guard Interval has been removed, extracts a signal in the frequency domain, and outputs the resulting signal to the demultiplexing unit 3055.

The demultiplexing unit 1055 demultiplexes the signal input from the radio receiver 3057 into signals such as the PCCH, the PSCH, and the uplink reference signal. The demultiplexing is performed based on radio resource allocation information, predetermined by the base station apparatus 3 using the radio resource control unit 3011, that is included in the uplink grant notified to each of the terminal apparatuses 1. Furthermore, the demultiplexing unit 3055 performs channel compensation of the PCCH and the PSCH based on the channel estimate value input from the measurement unit 3059. Furthermore, the demultiplexing unit 3055 outputs an uplink reference signal resulting from the demultiplexing, to the measurement unit 3059.

The demodulation unit 3053 performs Inverse Discrete Fourier Transform (IDFT) on the PSCH, acquires modulation symbols, and demodulates a reception signal for each of the modulation symbols in the PCCH and the PSCH, in compliance with a predetermined modulation scheme such as Binary Phase Shift Keying (BPSK), QPSK, 16 QAM, 64 QAM, and 256 QAM, or in compliance with the modulation scheme that the base station apparatus 3 notifies in advance to each of the terminal apparatuses 1 with the uplink grant. The demodulation unit 3053 demultiplexes the modulation symbols of multiple pieces of uplink data transmitted in the same PSCH with the MIMO SM, based on the number of spatially-multiplexed sequences notified in advance with the uplink grant to each of the terminal apparatuses 1 and information for indicating the precoding to be performed on the sequences.

The decoding unit 3051 decodes the coded bits of the PCCH and the PSCH, which have been demodulated, in compliance with a predetermined coding scheme by using the transmission or original coding rate that is predetermined or notified in advance with the uplink grant to the terminal apparatus 1 by the base station apparatus 3, and outputs the decoded uplink data and uplink control information to the higher layer processing unit 101. In a case that the PSCH is retransmitted, the decoding unit 3051 performs the decoding with the coded bits, input from the higher layer processing unit 301, that are retained in an HARQ buffer, and the coded bits that have been demodulated. The measurement unit 3059 measures the channel estimate value, the channel quality, or the like, based on the uplink reference signal input from the demultiplexing unit 3055, and outputs them to the demultiplexing unit 3055 and the higher layer processing unit 301.

The transmitter 307 generates the downlink reference signal in accordance with the control signal input from the controller 303, codes and modulates the downlink control information and the downlink data that are input from the higher layer processing unit 301, multiplexes the PCCH, the PSCH, and the downlink reference signal and transmits a signal resulting from the multiplexing to the terminal apparatus 1 through the transmit and/or receive antenna 309 or transmits the PCCH, the PSCH, and the downlink reference signal to the terminal apparatus 1 through the transmit and/or receive antenna 309 by using separate radio resources.

The coding unit 3071 codes the downlink control information and the downlink data input from the higher layer processing unit 301. The modulation unit 3073 modulates the coded bits input from the coding unit 3071, in compliance with a modulation scheme such as BPSK, QPSK, 16 QAM, 64 QAM, and 256 QAM.

The downlink reference signal generation unit 3079 generates, as the downlink reference signal, a sequence known to the terminal apparatus 1, the sequence being determined in accordance with a predetermined rule based on the physical cell identity (PCI) for identifying the base station apparatus 3, or the like.

The multiplexing unit 3075, in accordance with the number of PSCH layers to be spatially-multiplexed, maps at least one piece of downlink data to be transmitted in one PSCH to at least one layer, and performs precoding for the at least one layer. The multiplexing unit 3075 multiplexes the downlink physical channel signal and the downlink reference signal for each transmit antenna port. The multiplexing unit 3075 maps the downlink physical channel signal and the downlink reference signal to the resource element for each transmit antenna port.

The radio transmitter 3077 performs Inverse Fast Fourier Transform (IFFT) on the modulation symbol resulting from the multiplexing or the like to perform the modulation in compliance with an OFDM scheme, adds the Guard Interval to the OFDM-modulated OFDM symbol to generate a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and/or receive antenna 309 for transmission.

(1) More specifically, the terminal apparatus 1 according to the first aspect of the present invention is a terminal apparatus for communicating with a base station apparatus, the terminal apparatus 1 including: a transmitter configured to transmit a first reference signal, a second reference signal, and a physical uplink shared channel; and a receiver configured to receive a physical downlink control channel, wherein the physical uplink shared channel is transmitted based on downlink control information received via the physical downlink control channel, the first reference signal is mapped to some of resource elements in a resource block determined based on the downlink control information, and the second reference signal is generated based on first information for uniquely identifying the terminal apparatus.

(2) In the above-described first aspect, the first information is C-RNTI.

(3) In the above-described first aspect, the first information is a scramble ID included in the downlink control information.

(4) In the above-described first aspect, the first information is a user-specific ID included in the downlink control information.

(5) In the above-described first aspect, the second reference signal is coded or scrambled by using a predetermined coding method, and the downlink control information includes an index number for identifying the coded or scrambled sequence.

(6) In the above-described first aspect, the first information, the downlink control information include second information for indicating that the transmission power of some of resource elements for the second reference signal is configured to zero.

(7) A base station apparatus 3 according to a second aspect of the present invention is a base station apparatus for communicating with a terminal apparatus and a base station apparatus for communicating with a terminal apparatus, the base station apparatus including: a transmitter configured to transmit first information via a physical downlink control channel; a receiver configured to receive a first reference signal, a second reference signal, and a physical uplink shared channel, wherein the first reference signal is mapped to some of resource elements in a resource block determined based on the downlink control information, and the second reference signal is generated based on the first information for uniquely identifying a plurality of the terminal apparatuses mapped to a same resource.

(8) A communication method according to a third aspect of the present invention is a communication method for a terminal apparatus for communicating with a base station apparatus, the communication method including the steps of: transmitting a first reference signal, a second reference signal, and a physical uplink shared channel; and receiving a physical downlink control channel, wherein the physical uplink shared channel is transmitted based on downlink control information received by the physical downlink control channel, the first reference signal is mapped to some of resource elements in a resource block determined based on the downlink control information, and the second reference signal is generated based on first information for uniquely identifying the terminal apparatus.

(9) A communication method according to a fourth aspect of the present invention is a communication method for a base station apparatus for communicating with a terminal apparatus, the communication method including the steps of: transmitting first information via a physical downlink control channel; and receiving a first reference signal, a second reference signal, and a physical uplink shared channel, wherein the first reference signal is mapped to some of resource elements in a resource block determined based on the downlink control information, and the second reference signal is generated based on the first information for uniquely identifying a plurality of the terminal apparatuses mapped to a same resource.

(10) An integrated circuit according to a fifth aspect of the present invention is an integrated circuit implemented on a terminal apparatus for communicating with a base station apparatus, the integrated circuit including: a transmitting unit configured to transmit a first reference signal, a second reference signal, and a physical uplink shared channel; and a receiving unit configured to receive a physical downlink control channel, wherein the physical uplink shared channel is transmitted based on downlink control information received via the physical downlink control channel, the first reference signal is mapped to some of resource elements in a resource block determined based on the downlink control information, and the second reference signal is generated based on first information for uniquely identifying the terminal apparatus.

(11) An integrated circuit according to a sixth aspect of the present invention is an integrated circuit implemented on a base station apparatus for communicating with a terminal apparatus, the integrated circuit including: a transmitting unit configured to transmit first information via a physical downlink control channel; and a receiving unit configured to receive a first reference signal, a second reference signal, and a physical uplink shared channel, wherein the first reference signal is mapped to some of resource elements in a resource block determined based on the downlink control information, and the second reference signal is generated based on the first information for uniquely identifying a plurality of the terminal apparatuses mapped to a same resource.

A program running on an apparatus according to an aspect of the present invention may serve as a program that controls a Central Processing Unit (CPU) and the like to cause a computer to function in such a manner as to realize the functions of the embodiment according to the aspect of the present invention. Programs or the information handled by the programs are temporarily stored in a volatile memory such as a Random Access Memory (RAM), a non-volatile memory such as a flash memory, a Hard Disk Drive (HDD), or any other storage device system.

Note that a program for realizing the functions of the embodiment according to an aspect of the present invention may be recorded in a computer-readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically retaining the program for a short time, or any other computer readable recording medium.

Furthermore, each functional block or various characteristics of the apparatuses used in the above-described embodiment may be implemented or performed on an electric circuit, for example, an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. Furthermore, in a case that with advances in semiconductor technology, a circuit integration technology appears that replaces the present integrated circuits, it is also possible to use a new integrated circuit based on the technology according to one or more aspects of the present invention.

Although an example applied to a communication system including a base station apparatus and a terminal apparatus has been described in the embodiment according to an aspect of the present invention, the present invention may also be applied to a system such as D2D (Device to Device) in which terminals communicate with each other.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of one aspect of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a wireless LAN apparatus, or a sensor device), an integrated circuit (for example, a communication chip), or a program.

REFERENCE SIGNS LIST 1 (1A, 1B, 1C) Terminal apparatus
3 Base station apparatus
10 TXRU
11 Phase shifter
12 Antenna unit
101 Higher layer processing unit
103 Controller
105 Receiver
107 Transmitter
109 Antenna unit
301 Higher layer processing unit
303 Controller
305 Receiver
307 Transmitter
1011 Radio resource control unit
1013 Scheduling information interpretation unit
1015 Channel state information report control unit
1051 Decoding unit
1053 Demodulation unit
1055 Demultiplexing unit
1057 Radio receiver
1059 Measurement unit
1071 Coding unit
1073 Modulation unit
1075 Multiplexing unit
1077 Radio transmitter
1079 Uplink reference signal generation unit
3011 Radio resource control unit
3013 Scheduling unit
3015 Channel state information report control unit
3051 Decoding unit
3053 Demodulation unit
3055 Demultiplexing unit
3057 Radio receiver
3059 Measurement unit
3071 Coding unit
3073 Modulation unit
3075 Multiplexing unit
3077 Radio transmitter
3079 Downlink reference signal generation unit

The invention claimed is:

1. A terminal apparatus for communicating with a base station apparatus, the terminal apparatus comprising:
multiplexing circuitry configured to map a phase tracking reference signal (PTRS) and a demodulation reference signal (DMRS) on resource elements; and
transmission circuitry configured to transmit a physical uplink shared channel (PUSCH), wherein
the multiplexing circuitry is configured to map the PTRS on a subcarrier position of a resource element based on at least a cell-radio network temporary identifier (C-RNTI) and a frequency density of the PTRS,
the multiplexing circuitry is configured to map the DMRS on a resource element which is different from the resource element on which the PTRS is mapped, and
the transmission circuitry is configured to transmit the PUSCH on which the PTRS is mapped.

2. A base station apparatus for communicating with a terminal apparatus, the base station apparatus comprising:
reception circuitry configured to receive a physical uplink shared channel (PUSCH); and
demultiplexing circuitry configured to demultiplex a phase tracking reference signal (PTRS) and a demodulation reference signal (DMRS) from the PUSCH, the PTRS and the DMRS being mapped on resource elements, wherein
the PTRS is mapped on a subcarrier position of a resource element based on at least a cell-radio network temporary identifier (C-RNTI) and a frequency density of the PTRS, and the DMRS is mapped on a resource element which is different from the resource element on which the PTRS is mapped, and
the reception circuitry is configured to receive the PUSCH on which the PTRS is mapped.

3. A communication method for a terminal apparatus for communicating with a base station apparatus, the communication method comprising the steps of:
mapping a phase tracking reference signal (PTRS) and a demodulation reference signal (DMRS) on resource elements; and
transmitting a physical uplink shared channel (PUSCH) on which the PTRS is mapped, wherein
the PTRS is mapped on a subcarrier position of a resource element based on at least a cell-radio network temporary identifier (C-RNTI) and a frequency density of the PTRS, and the DMRS is mapped on a resource element which is different from the resource element on which the PTRS is mapped, and
the PUSCH on which the PTRS is mapped is transmitted.

4. A communication method for a base station apparatus for communicating with a terminal apparatus, the communication method comprising the steps of:
receiving a physical uplink shared channel (PUSCH); and
demultiplexing, a phase tracking reference signal (PTRS) and a demodulation reference signal (DMRS) from the PUSCH, the PTRS and the DMRS being mapped on resource elements, wherein
the PTRS is mapped on a subcarrier position of a resource element based on at least a cell-radio network temporary identifier (C-RNTI) and a frequency density of the PTRS, and the DMRS is mapped on a resource element which is different from the resource element on which the PTRS is mapped, and
the PUSCH on which the PTRS is mapped is received.

* * * * *